United States Patent
Shintani et al.

(10) Patent No.: US 10,732,872 B2
(45) Date of Patent: Aug. 4, 2020

(54) STORAGE SYSTEM AND STORAGE CONTROL METHOD

(71) Applicant: HITACHI, LTD., Tokyo (JP)

(72) Inventors: Shotaro Shintani, Tokyo (JP); Kentaro Shimada, Tokyo (JP); Makio Mizuno, Tokyo (JP); Sadahiro Sugimoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/329,570

(22) PCT Filed: Feb. 27, 2017

(86) PCT No.: PCT/JP2017/007282
§ 371 (c)(1),
(2) Date: Feb. 28, 2019

(87) PCT Pub. No.: WO2018/154743
PCT Pub. Date: Aug. 30, 2018

(65) Prior Publication Data
US 2019/0258599 A1  Aug. 22, 2019

(51) Int. Cl.
*G06F 3/06* (2006.01)
*G06F 13/40* (2006.01)
(Continued)

(52) U.S. Cl.
CPC .......... *G06F 3/0635* (2013.01); *G06F 3/061* (2013.01); *G06F 3/0611* (2013.01);
(Continued)

(58) Field of Classification Search
CPC .... G06F 3/0611; G06F 3/0613; G06F 3/0658; G06F 3/0659; G06F 3/0679;
(Continued)

(56) References Cited

U.S. PATENT DOCUMENTS 6,195,354 B1 * 2/2001 Skalecki ............. H04L 12/5602
370/232
8,880,715 B2 * 11/2014 Bailey ..................... H04L 69/16
709/230

(Continued)

FOREIGN PATENT DOCUMENTS

JP   2007-256993 A   10/2007
JP   2009-140179 A    6/2009
(Continued)

OTHER PUBLICATIONS

"SAS as a budding fabric." Embedded Computing Design. Online Oct. 12, 2007. Retrieved from Internet Mar. 13, 2020. <http://embedded-computing.com/article-id/?2258=>. (Year: 2020).*
(Continued)

*Primary Examiner* — Thomas J. Cleary
(74) *Attorney, Agent, or Firm* — Volpe and Koenig, P.C.

(57) ABSTRACT

Provided is a storage system that includes a plurality of storage devices; a controller that controls the storage device including a processor and a memory; and a data transfer path connecting each of the storage devices to the controller. The storage device is divided into a plurality of groups. The controller specifies the storage device belonging to each of the plurality of groups among the plurality of storage devices connected via the plurality of independent data transfer paths, receives an access request to specify the storage device to be accessed, and designates the different data transfer paths for each group of the specified storage devices. The storage device performs data transfer by a connection-less protocol according to the designated data transfer path.

14 Claims, 24 Drawing Sheets

(51) Int. Cl.
  *G06F 13/42* (2006.01)
  *G06F 13/38* (2006.01)
  *G06F 3/08* (2006.01)
  *G06F 13/14* (2006.01)
(52) U.S. Cl.
  CPC .......... *G06F 3/0659* (2013.01); *G06F 3/0679* (2013.01); *G06F 3/0683* (2013.01); *G06F 3/08* (2013.01); *G06F 13/14* (2013.01); *G06F 13/38* (2013.01); *G06F 13/4022* (2013.01); *G06F 13/4282* (2013.01); *G06F 2213/0028* (2013.01); *G06F 2213/0036* (2013.01)
(58) Field of Classification Search
  CPC .... G06F 3/0683; G06F 3/0688; G06F 3/0689; G06F 3/08; G06F 13/14; G06F 13/16; G06F 13/1668; G06F 13/38; G06F 13/4022; G06F 13/4282; G06F 2213/0028; G06F 2213/0036; G06F 3/0635; G06F 3/061
  See application file for complete search history.

(56) References Cited

U.S. PATENT DOCUMENTS

| | | | |
|---|---|---|---|
| 10,067,794 B1* | 9/2018 | Watson | G06F 3/061 |
| 2007/0220204 A1 | 9/2007 | Nakajima et al. | |
| 2008/0059687 A1* | 3/2008 | Mayer | G06F 13/4022 |
| | | | 710/317 |
| 2008/0126698 A1* | 5/2008 | Honda | G06F 3/0607 |
| | | | 711/114 |
| 2009/0031057 A1* | 1/2009 | Ghosalkar | G06F 3/0613 |
| | | | 710/38 |
| 2009/0147673 A1 | 6/2009 | Niigata | |
| 2009/0259791 A1 | 10/2009 | Mizuno et al. | |
| 2012/0191921 A1* | 7/2012 | Shaeffer | G06F 13/1678 |
| | | | 711/149 |
| 2013/0311719 A1* | 11/2013 | Doedline, Jr. | G06F 3/0613 |
| | | | 711/114 |
| 2013/0332767 A1* | 12/2013 | Fox | G06F 15/167 |
| | | | 714/4.3 |
| 2015/0350322 A1 | 12/2015 | Akaike et al. | |
| 2016/0117281 A1 | 4/2016 | Akaike et al. | |
| 2017/0177264 A1* | 6/2017 | Liu | G06F 3/0613 |
| 2018/0059987 A1* | 3/2018 | Nimmagadda | G06F 12/00 |
| 2019/0146684 A1* | 5/2019 | Benisty | G06F 3/0688 |
| | | | 711/102 |

FOREIGN PATENT DOCUMENTS

| | | |
|---|---|---|
| JP | 2009-258841 A | 11/2009 |
| JP | 2015-532985 A | 11/2015 |
| WO | 2014/039922 A2 | 3/2014 |
| WO | 2015/045030 A1 | 4/2015 |
| WO | 2015/136619 A1 | 9/2015 |

OTHER PUBLICATIONS

International Search Report dated May 30, 2017 for the International Application No. PCT/JP2017/007282.

* cited by examiner

[FIG. 1A]
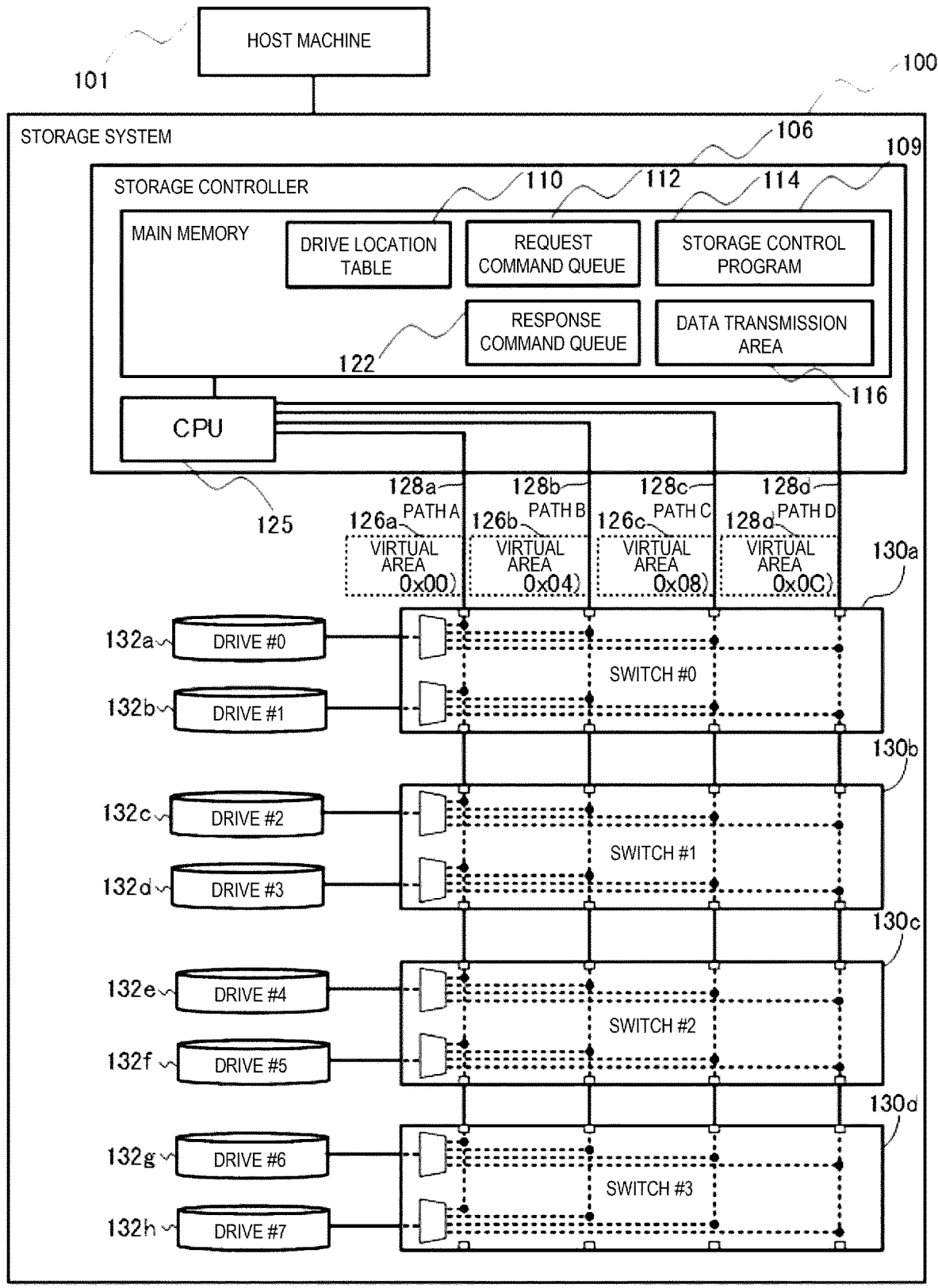

[FIG. 1B]
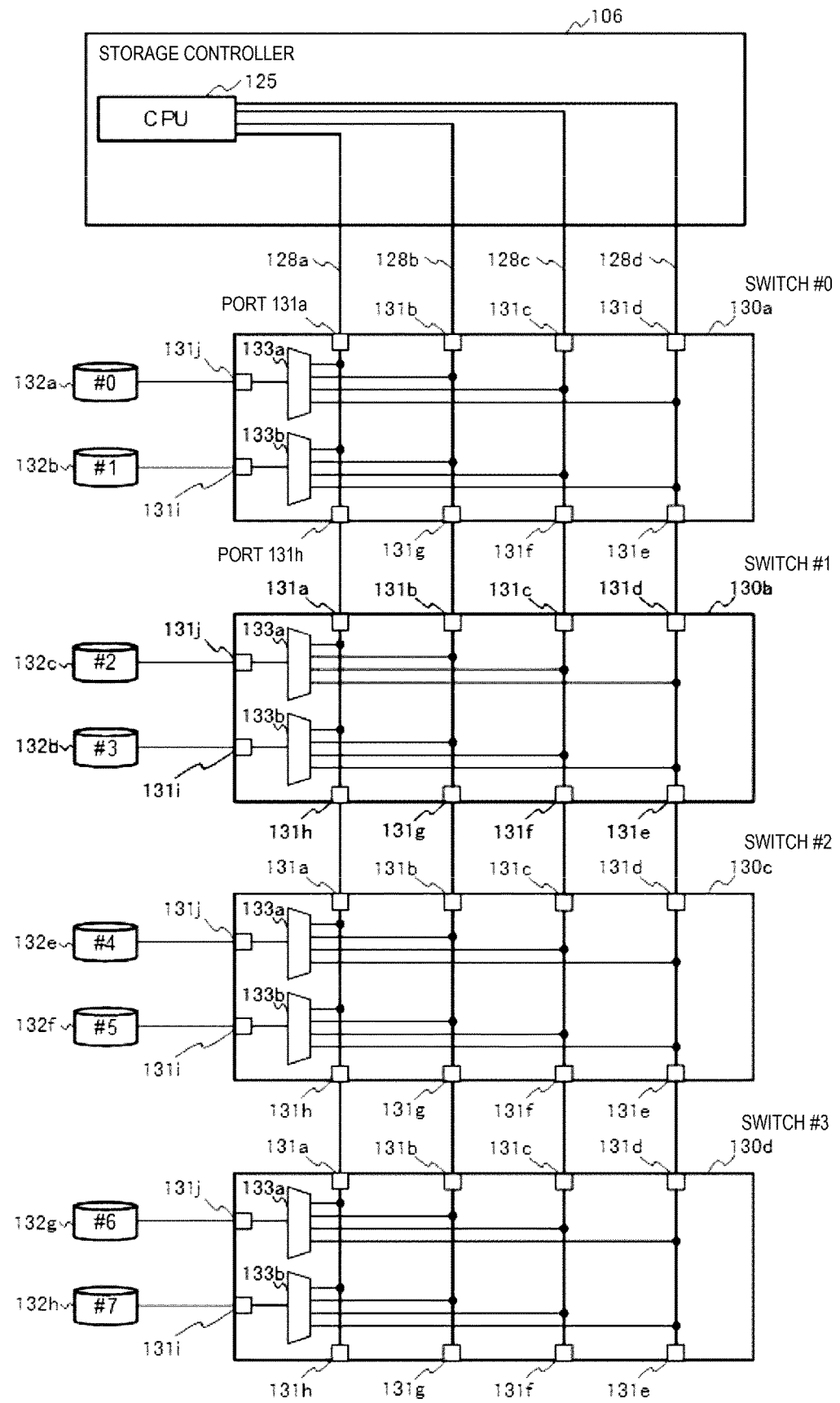

[FIG. 1C]

110 DRIVE LOCATION TABLE

| DRIVE No (1101) | SWITCH No (1102) |
|---|---|
| 1 | 1 |
| 2 | 1 |
| 3 | 2 |
| 4 | 2 |
| 5 | 3 |
| 6 | 3 |
| 7 | 4 |
| 8 | 4 |

[FIG. 2]
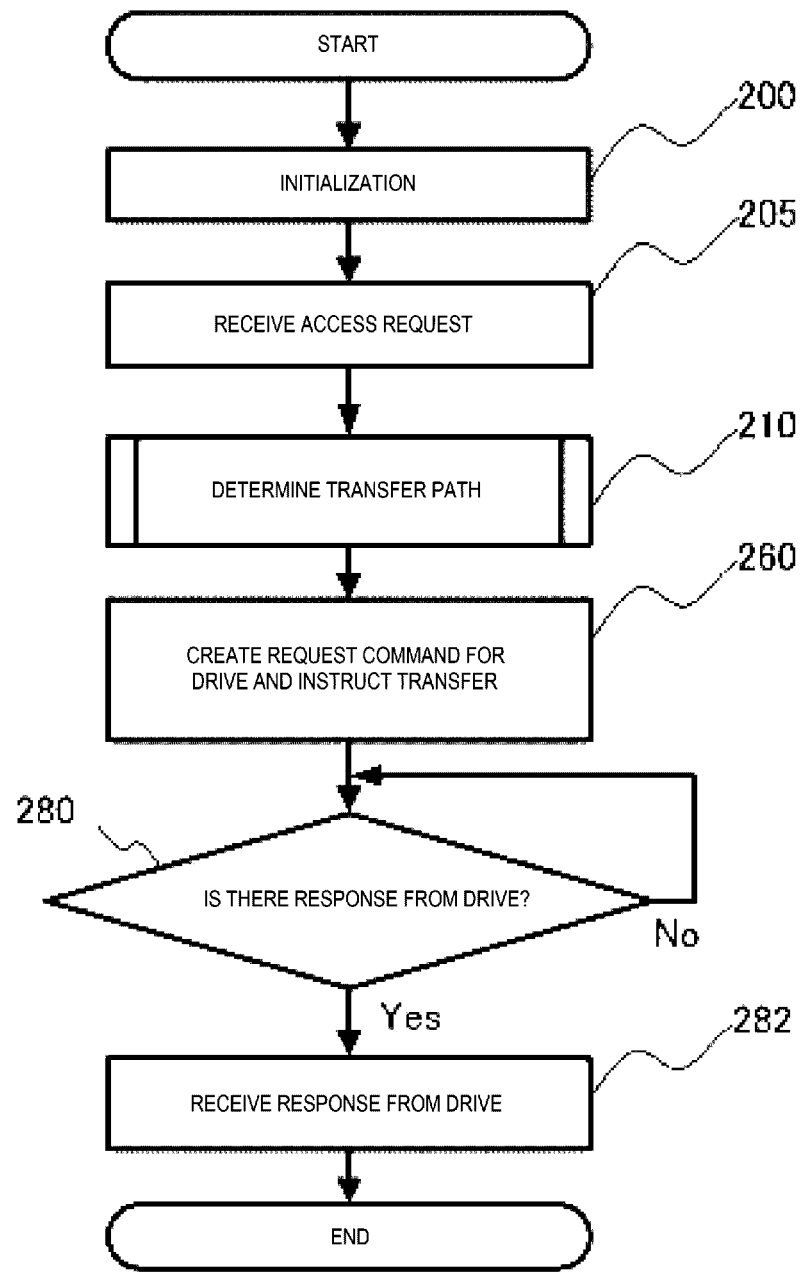

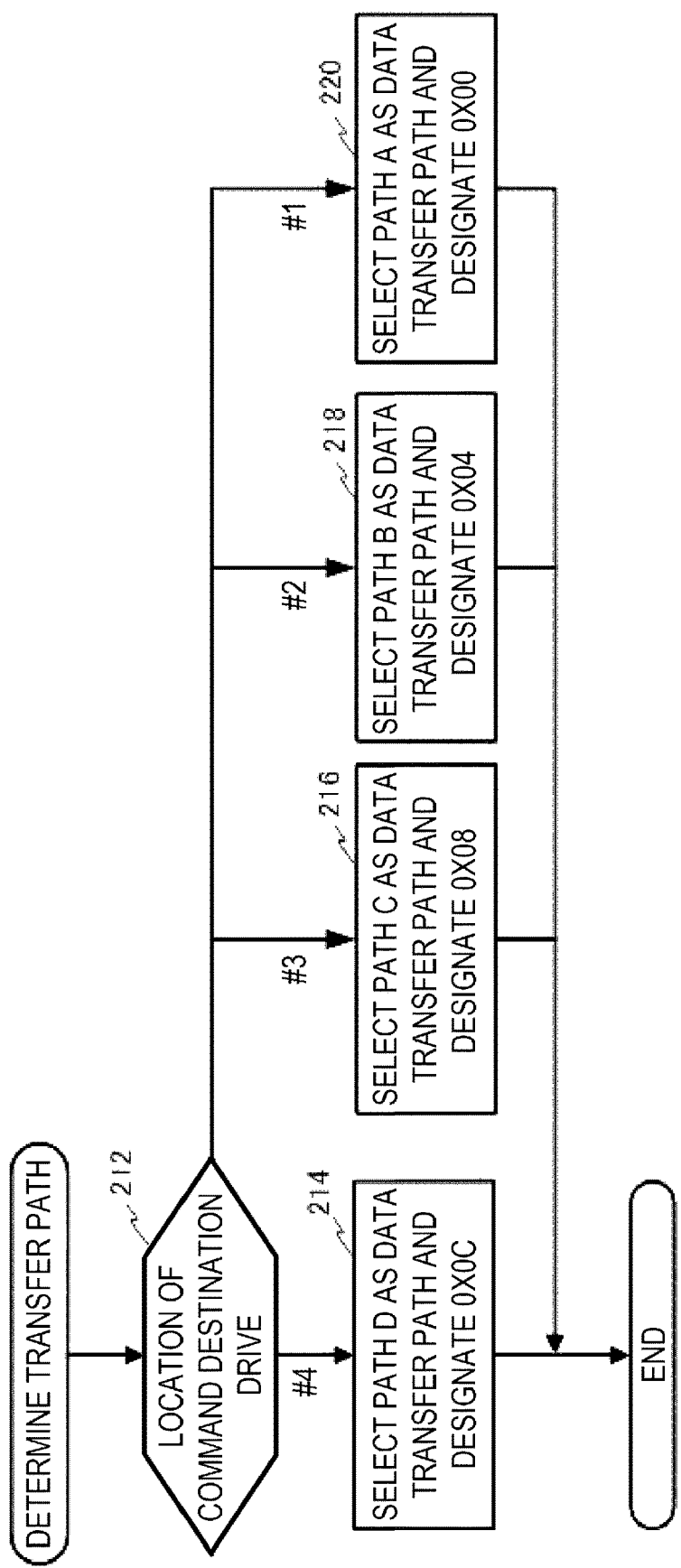
[FIG. 3]

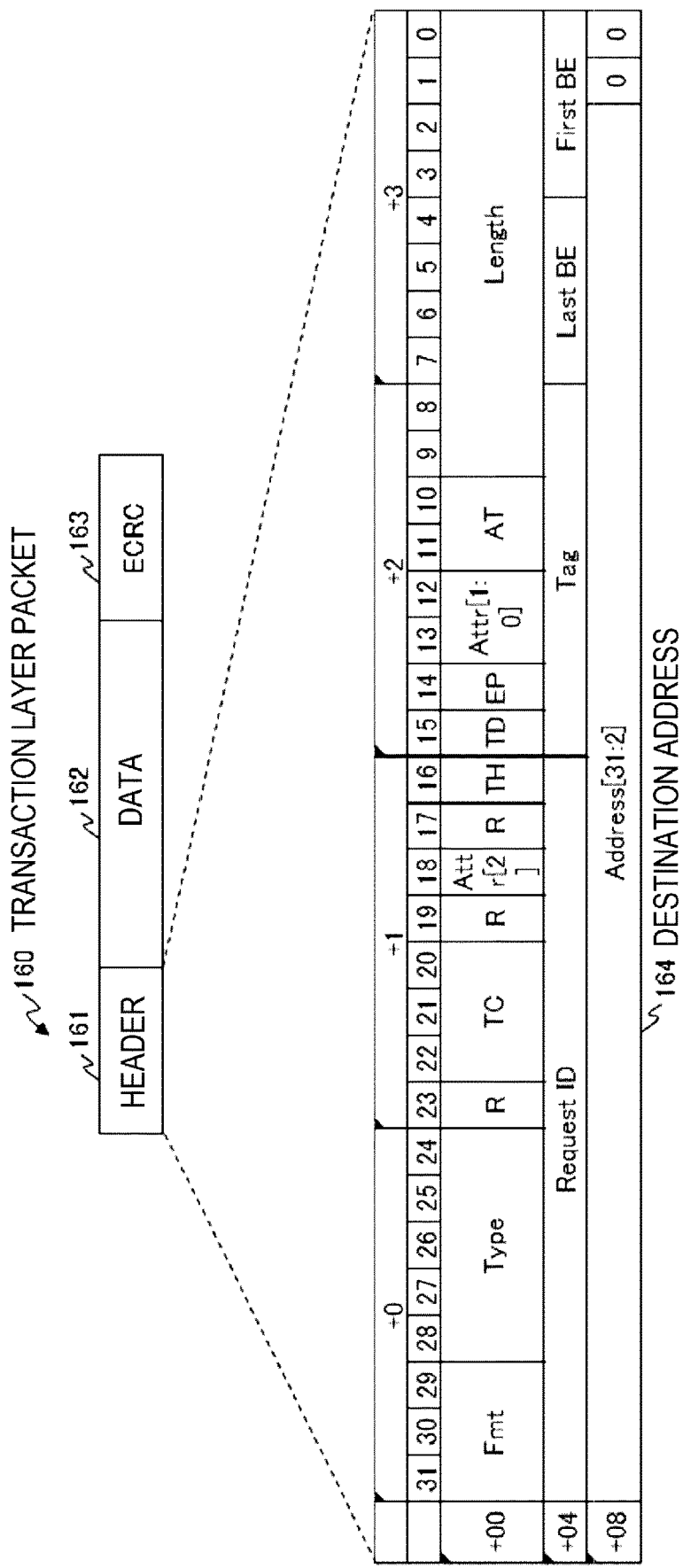
[FIG. 4]

[FIG 5A]
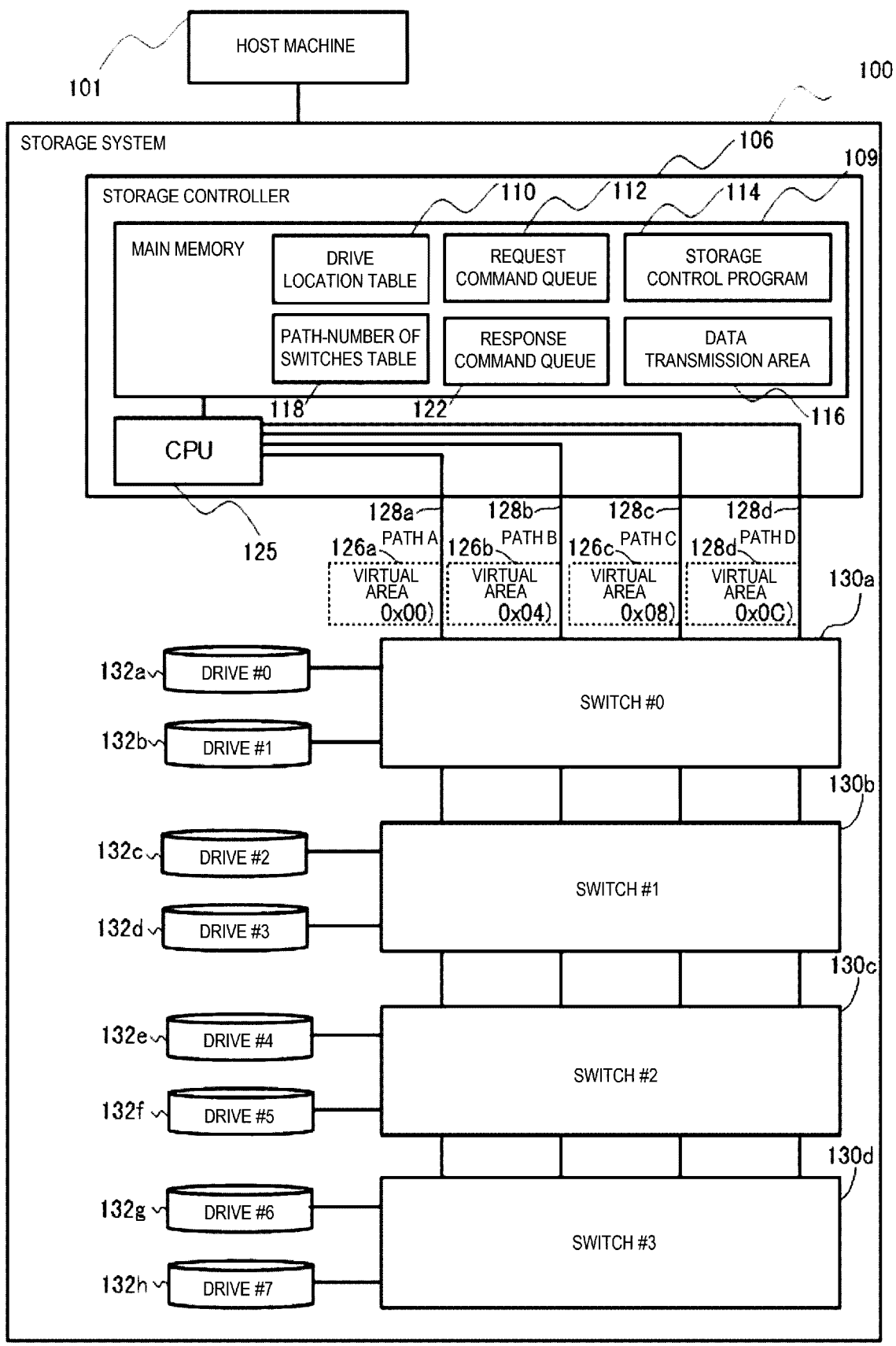

[FIG. 5B]
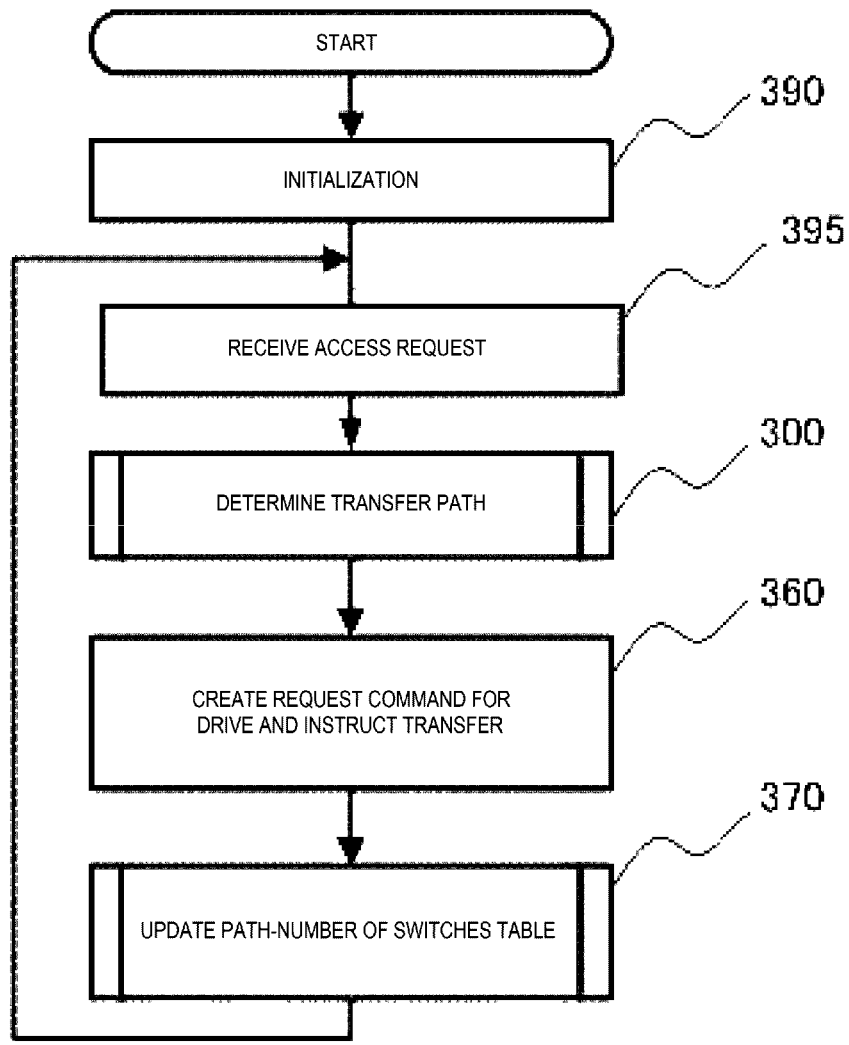
[FIG. 6A]

[FIG. 6B]
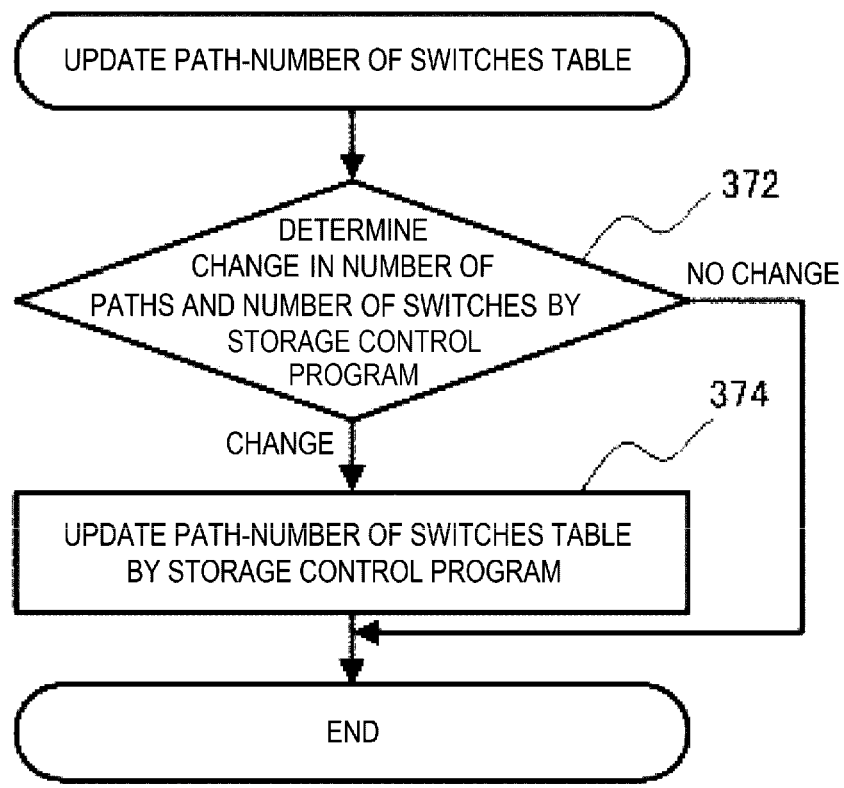

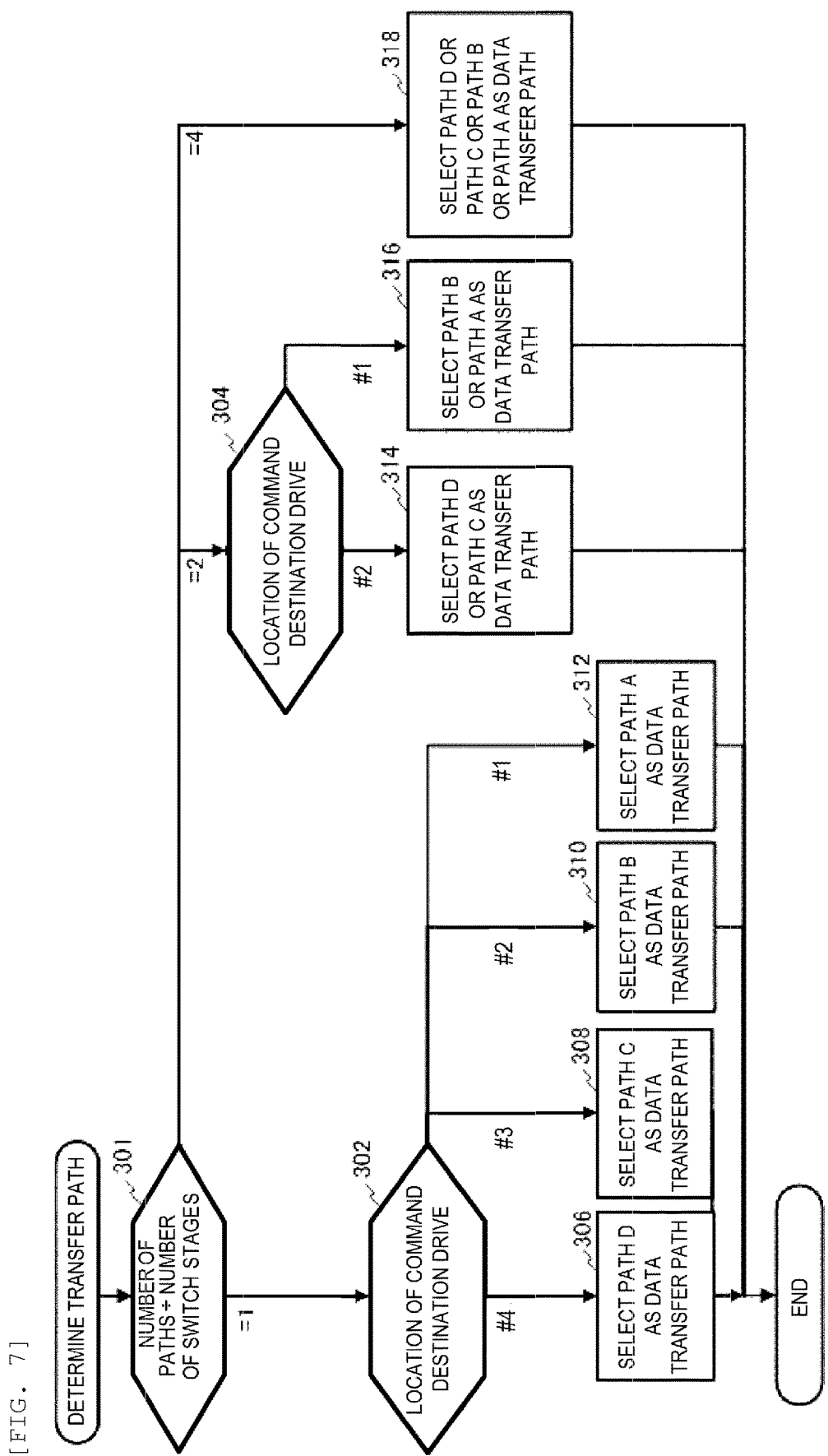
[FIG. 7]

[FIG. 8]
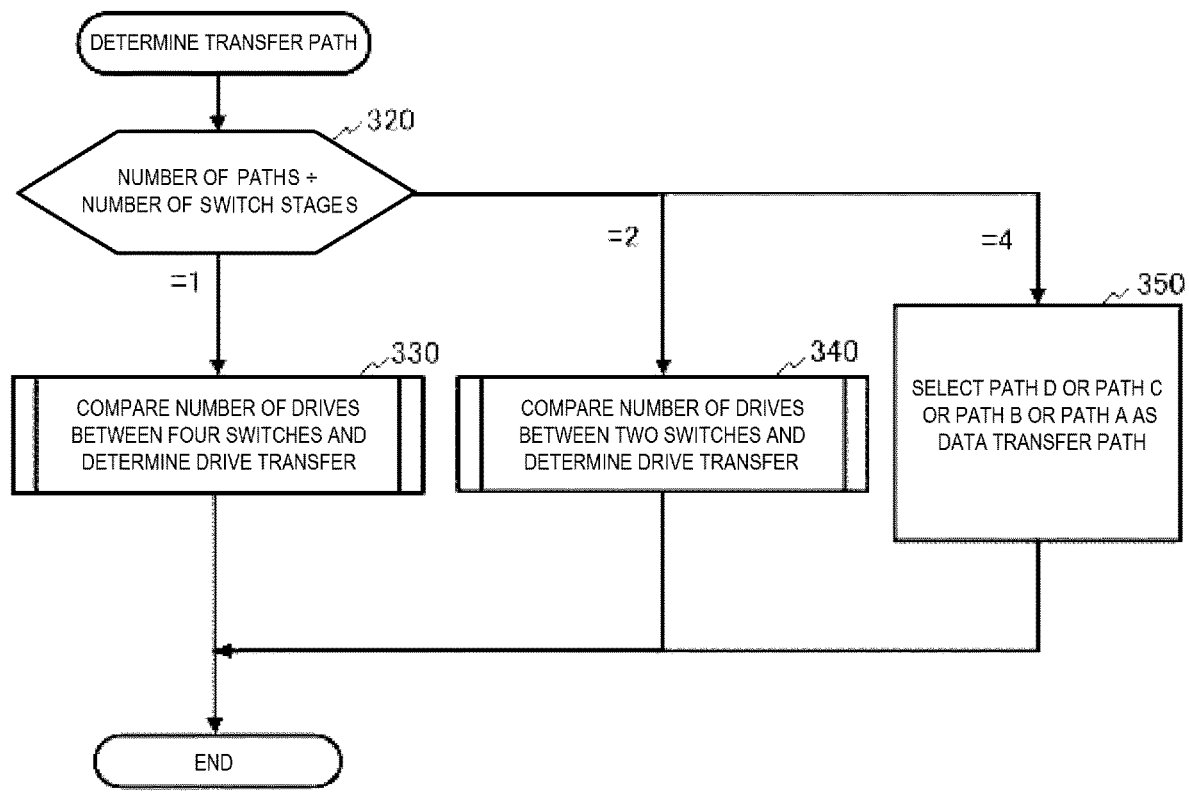

[FIG. 9]
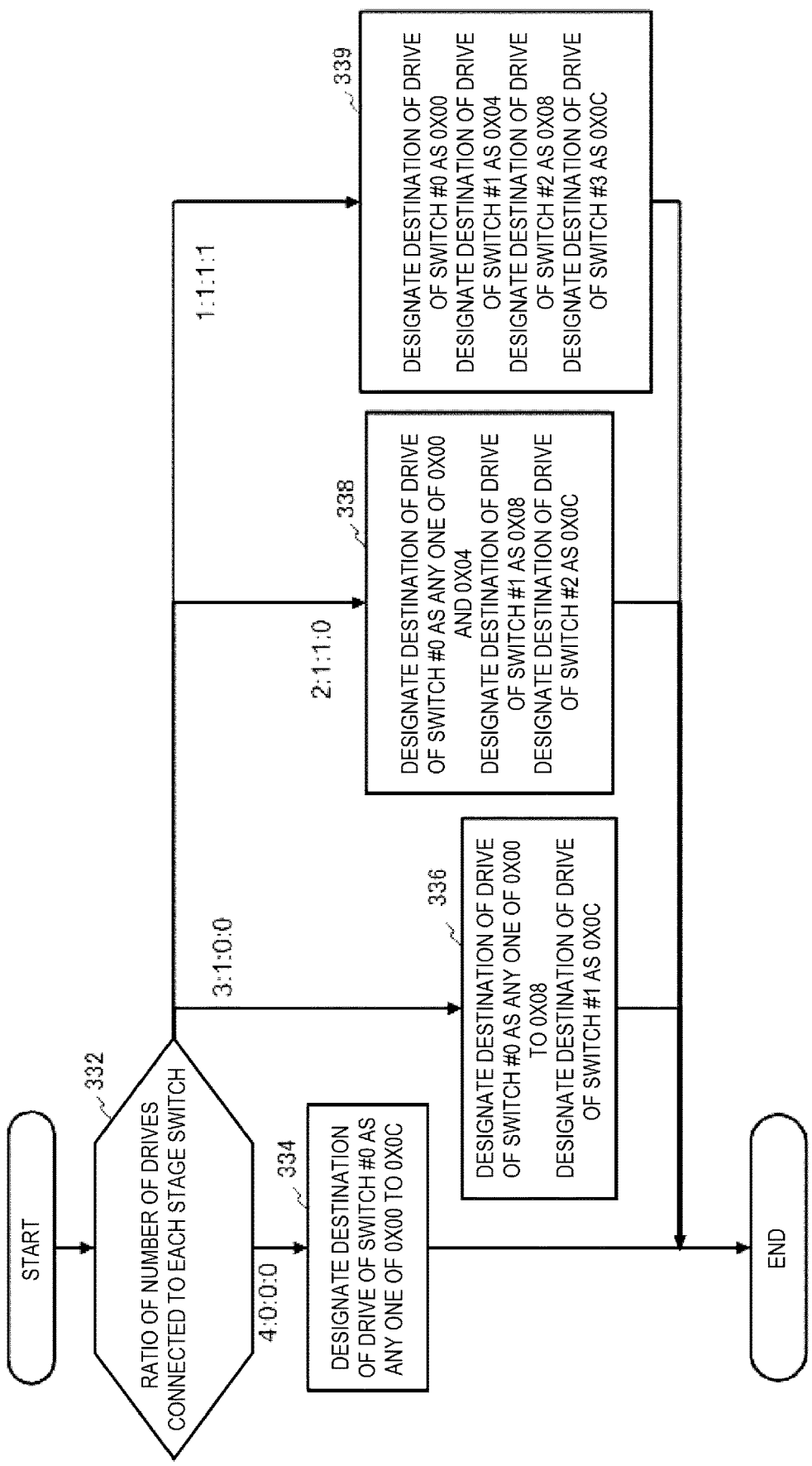

[FIG. 10]
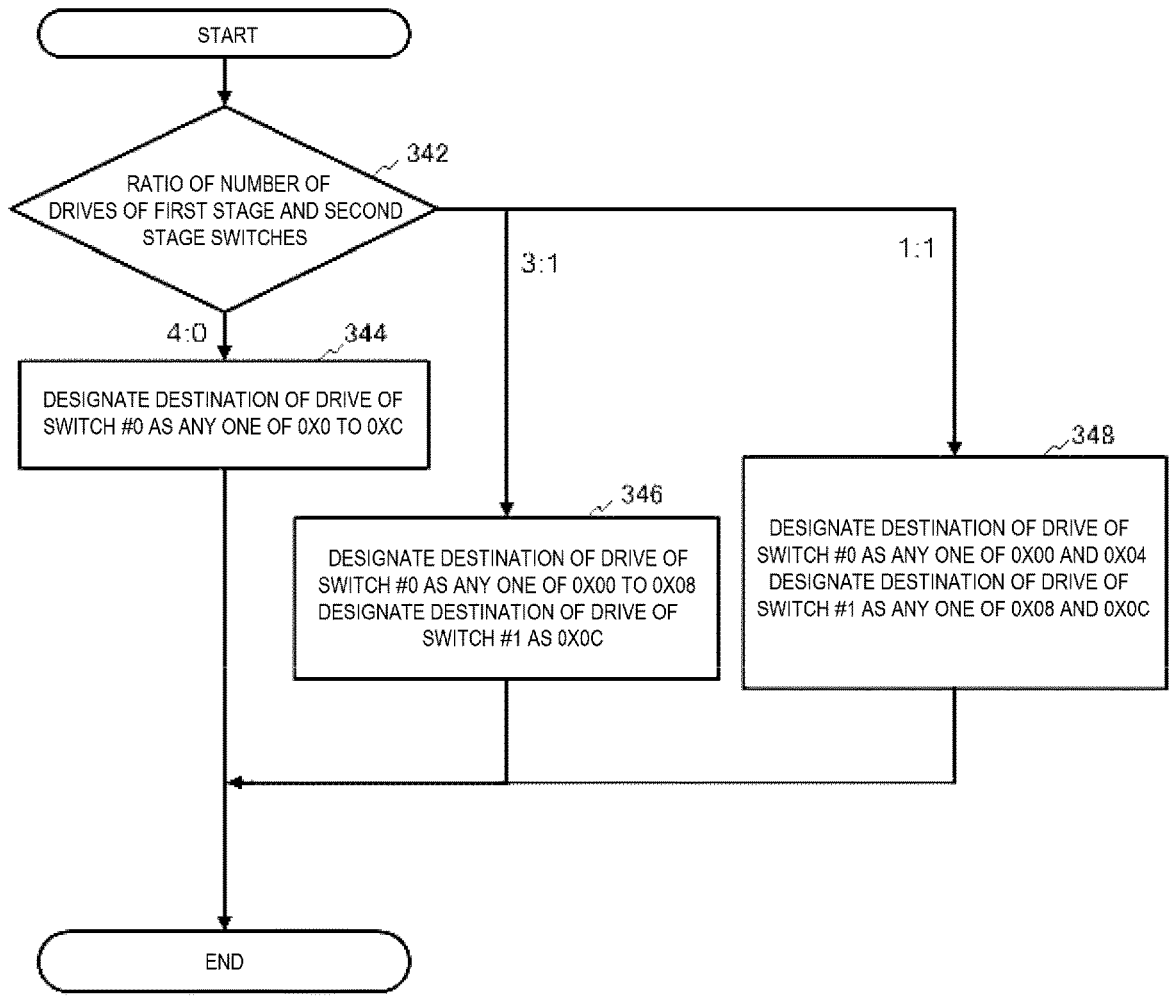

[FIG. 11A]
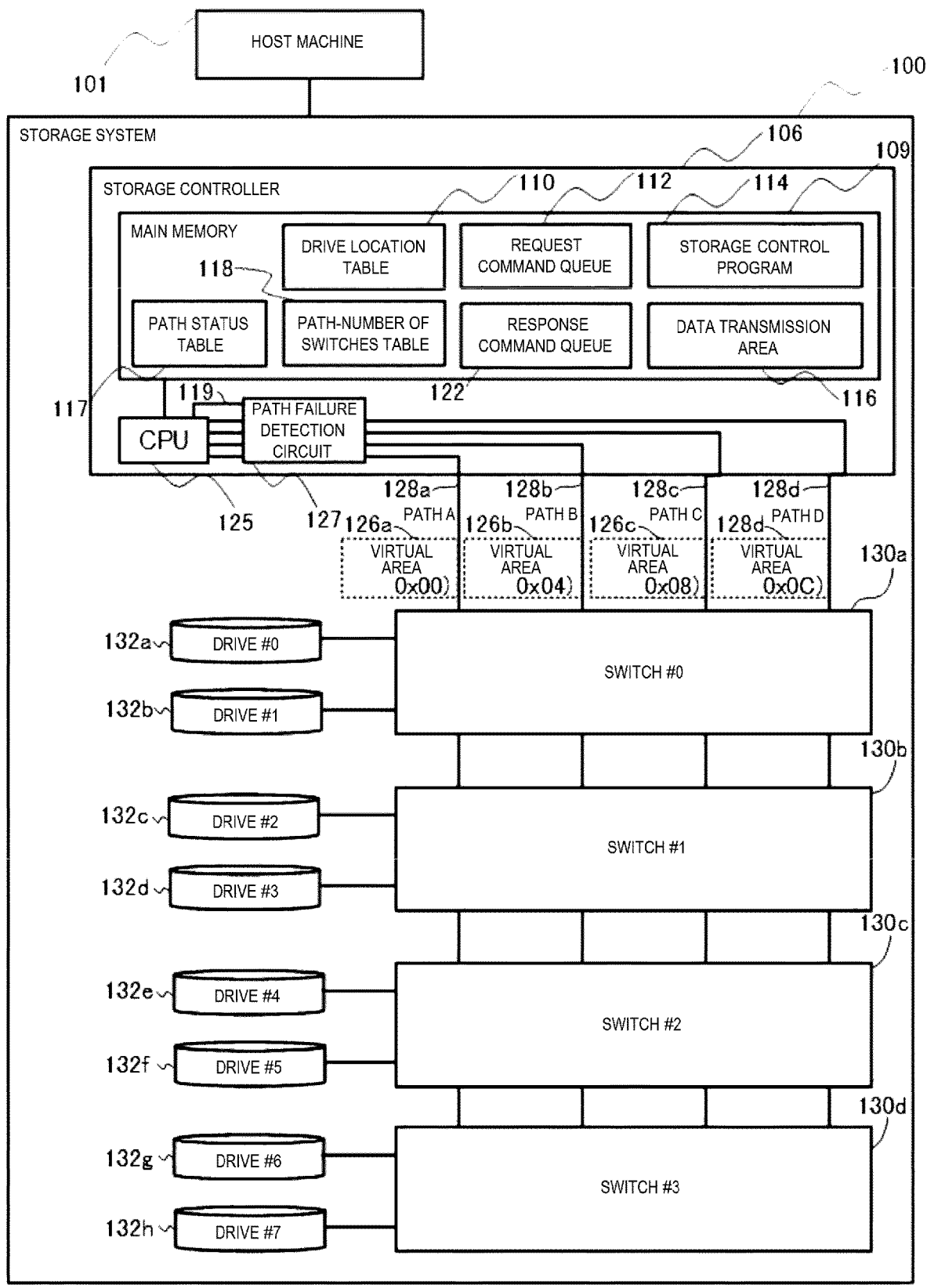

[FIG. 11B]
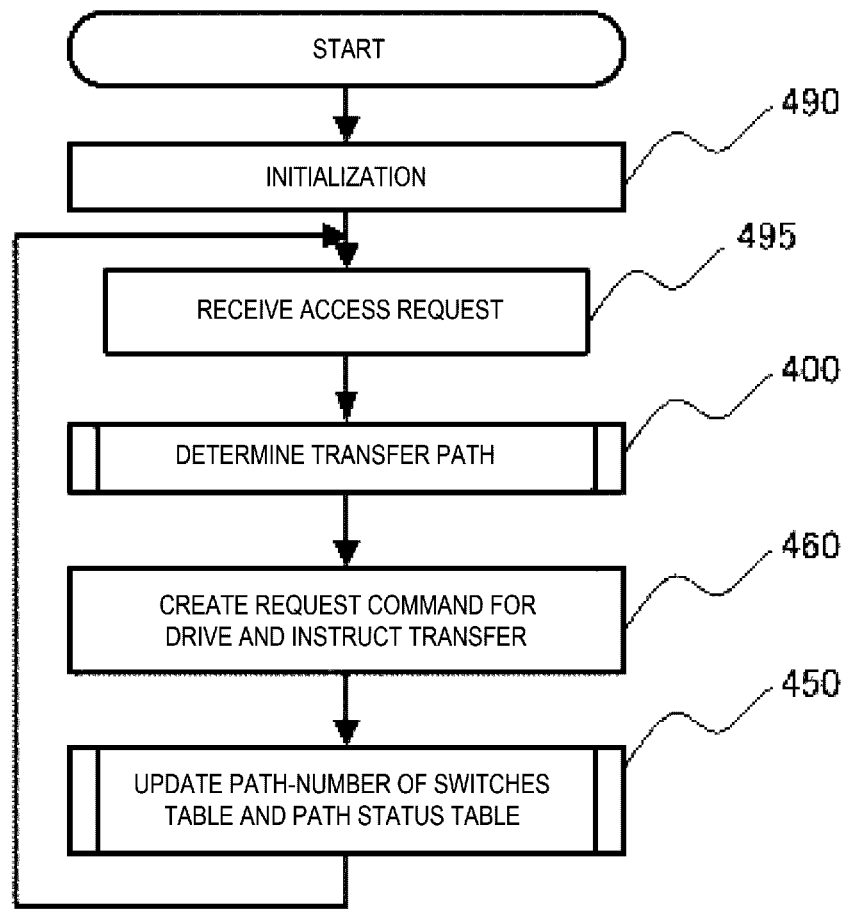
[FIG. 12A]

[FIG. 12B]
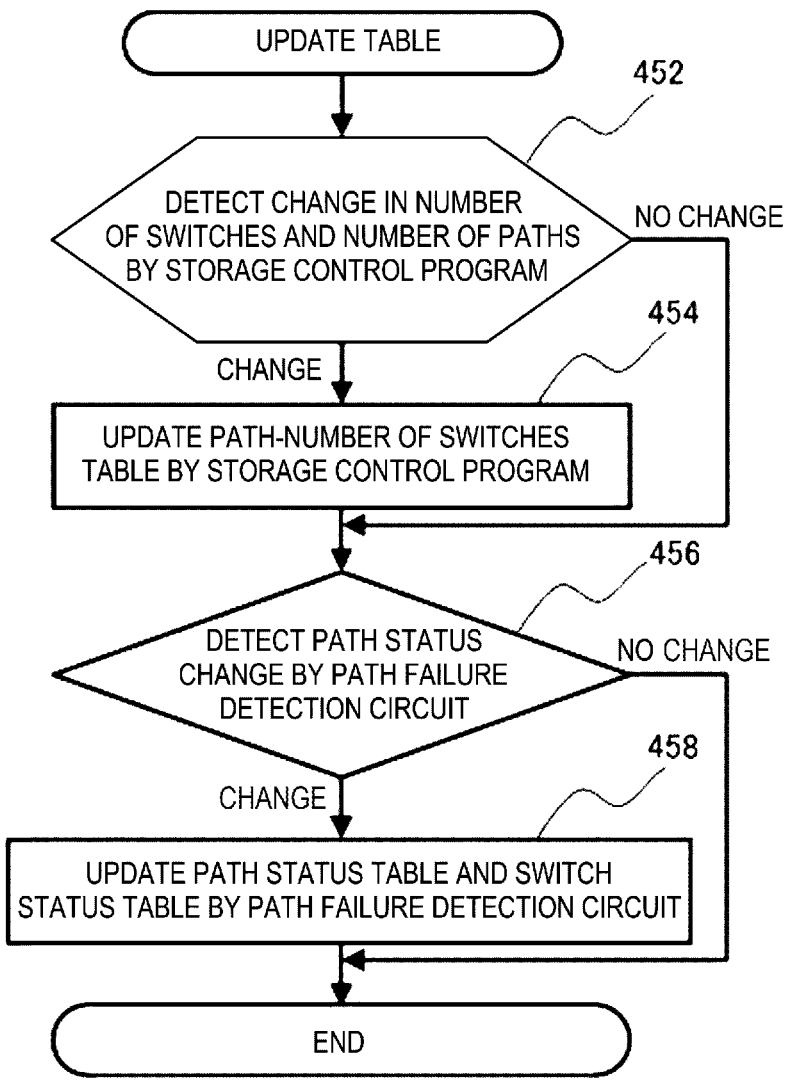

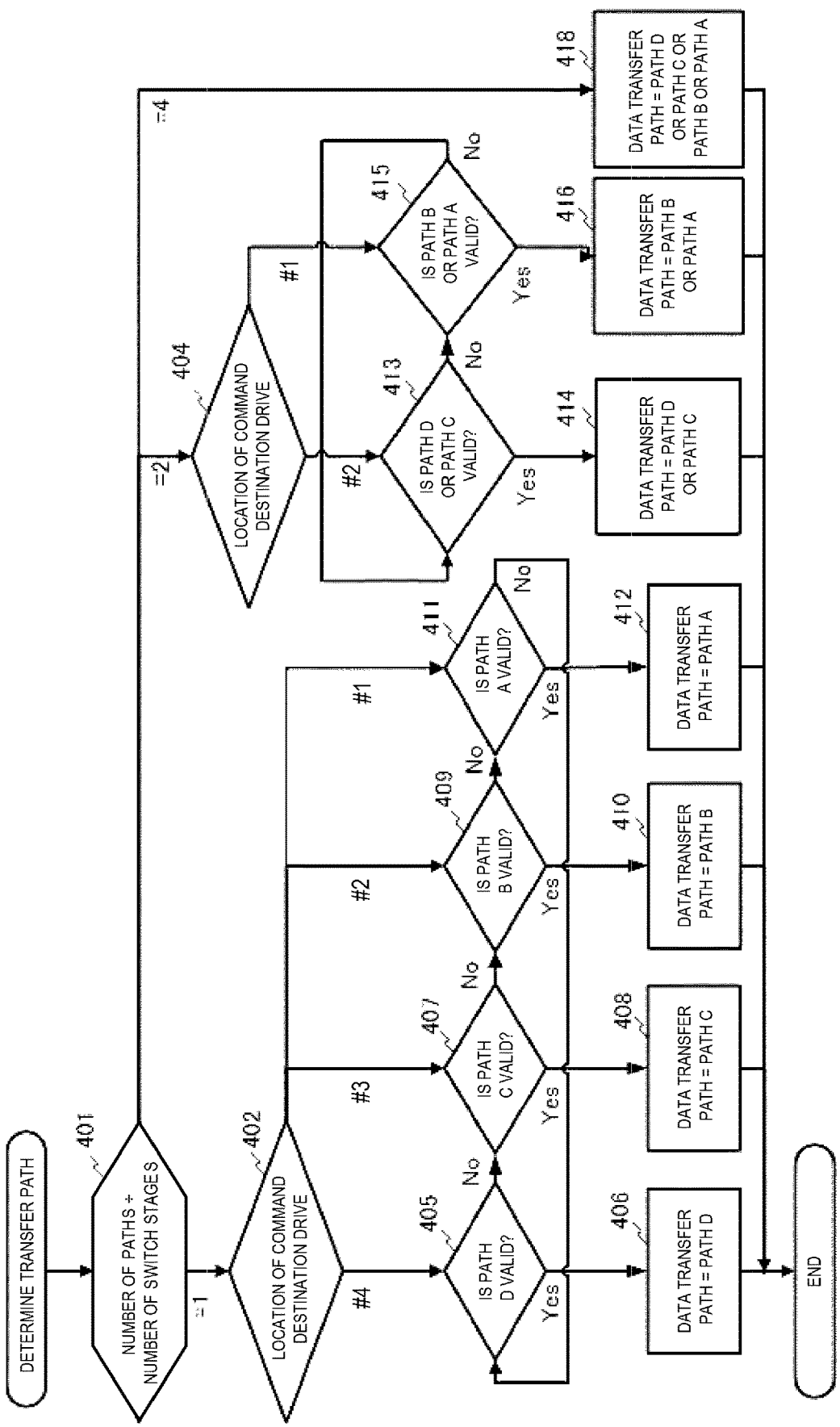

[FIG. 14A]
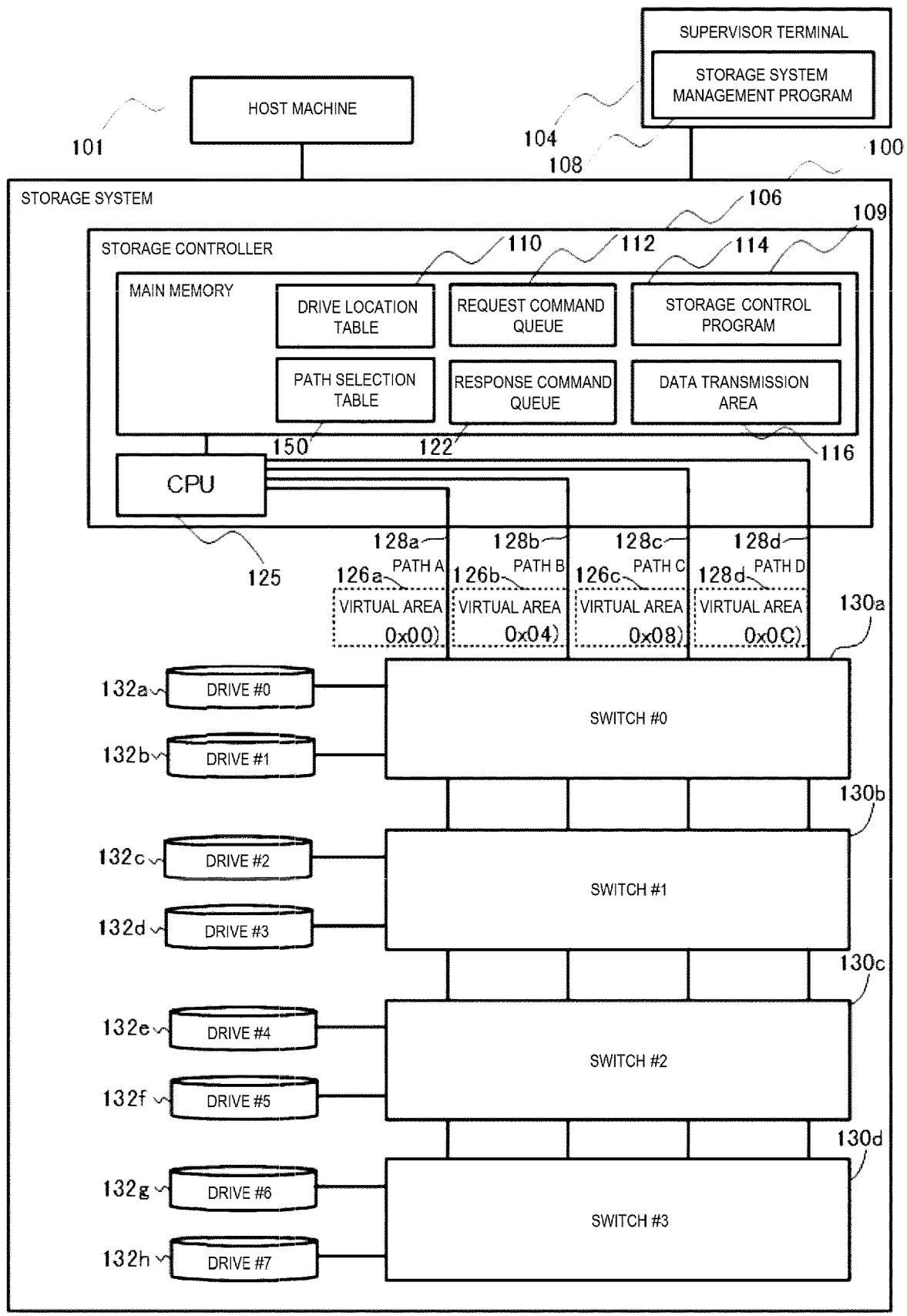

[FIG. 14B]
150 PATH SELECTION TABLE
| Switch | FIRST SWITCH | SECOND SWITCH | THIRD SWITCH | FOURTH SWITCH |
|---|---|---|---|---|
| PATH | PATH A | PATH B | PATH C | PATH D |
1501, 1502
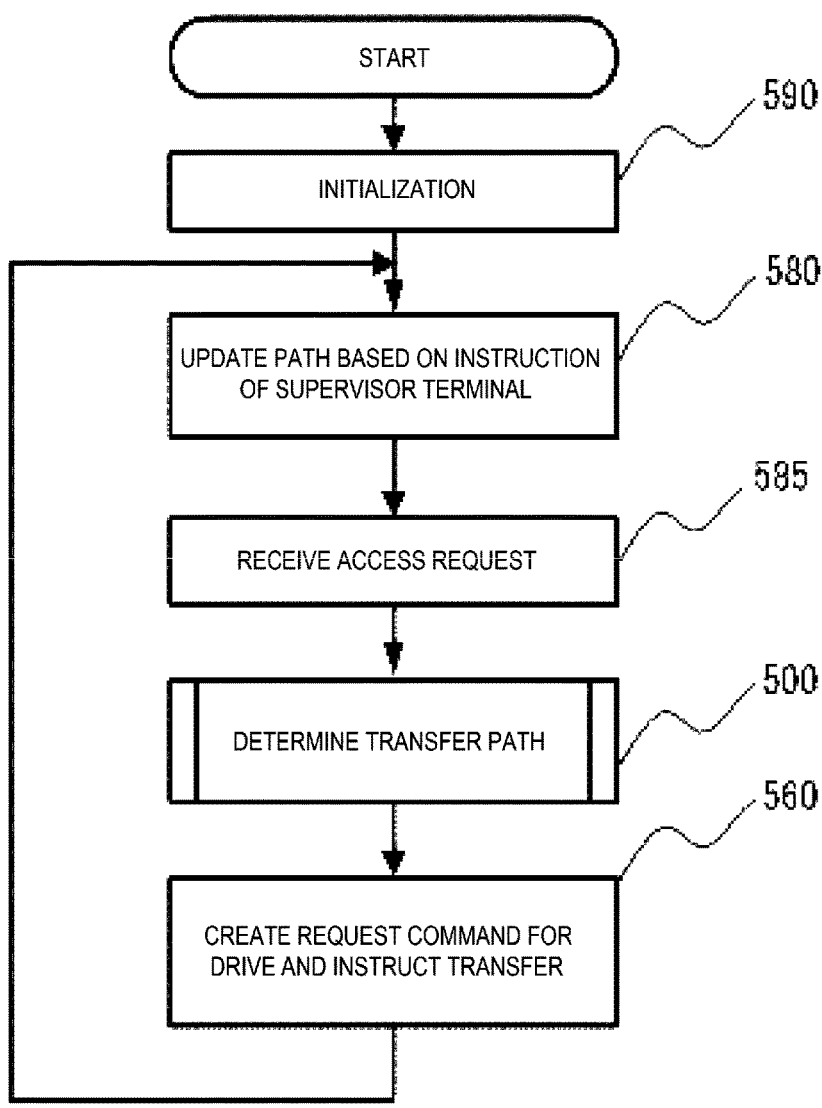
[FIG. 15]

[FIG. 16]
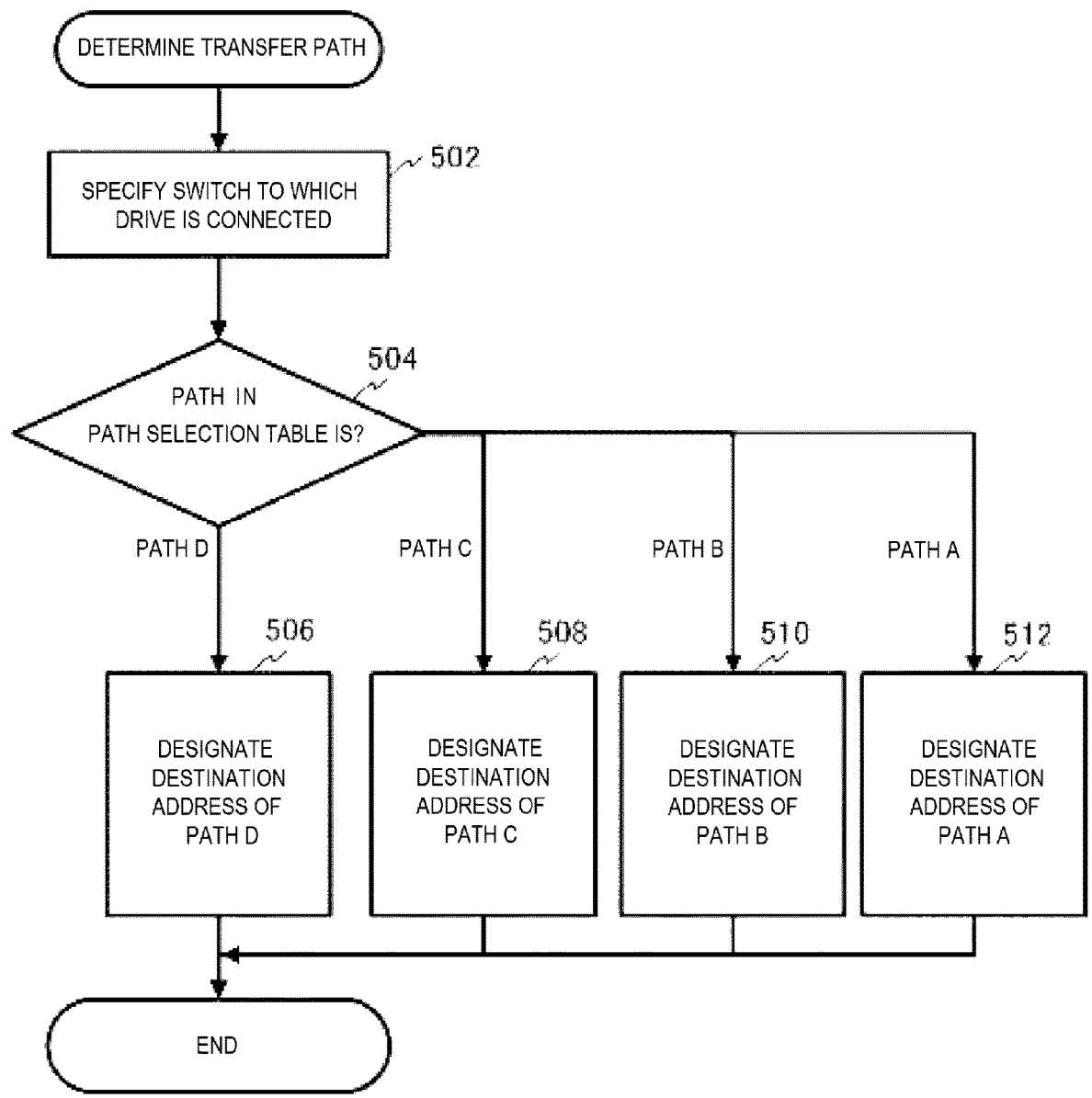

[FIG. 17A]
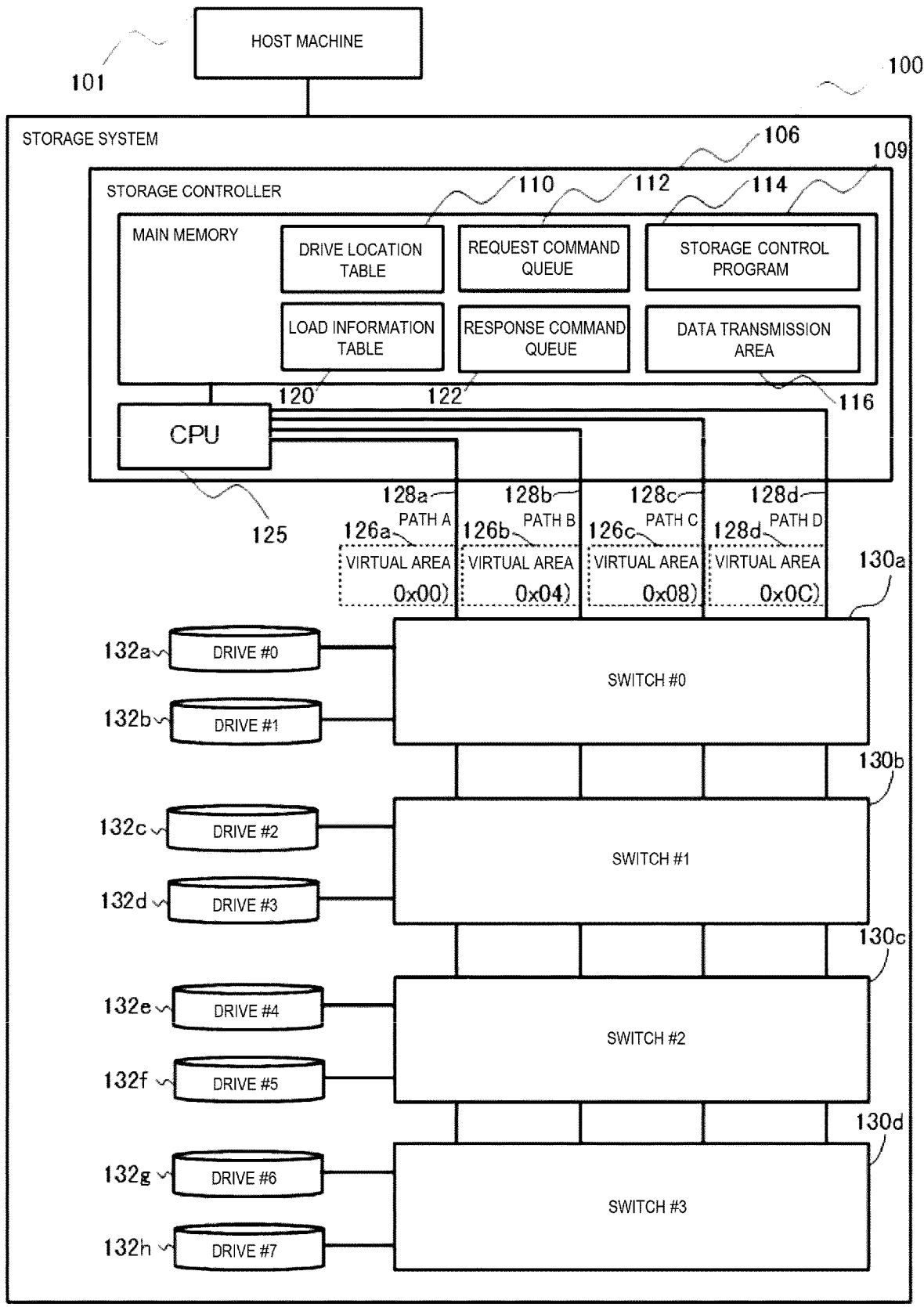

[FIG. 17B]

120 LOAD INFORMATION TABLE

| Switch | FIRST | SECOND | THIRD | FOURTH |
|---|---|---|---|---|
| NUMBER OF COMMANDS BEING ISSUED | 15 | 20 | 30 | 10 |

1201 — Switch row
1202 — NUMBER OF COMMANDS BEING ISSUED row

[FIG. 18]
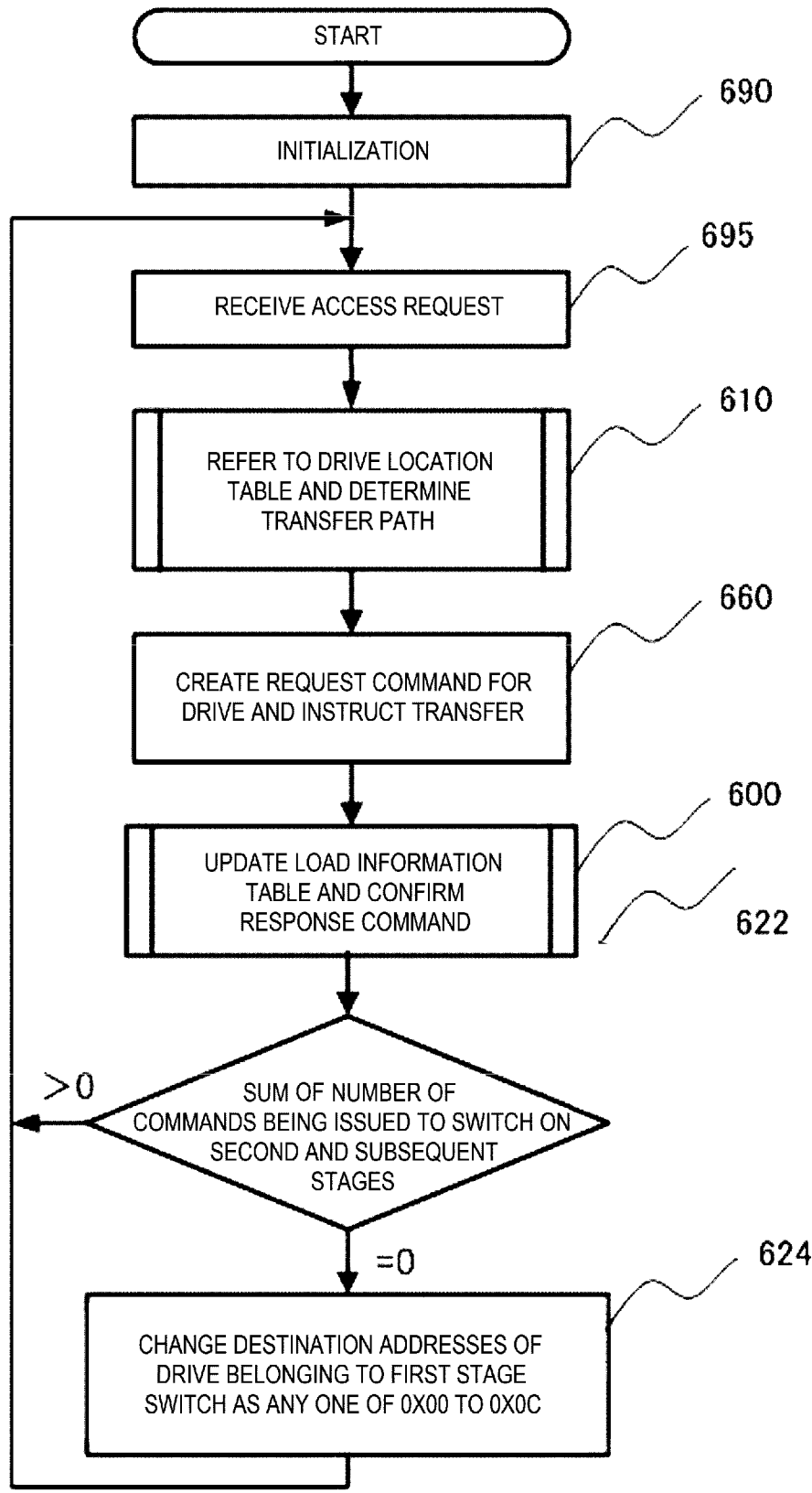

[FIG. 19]
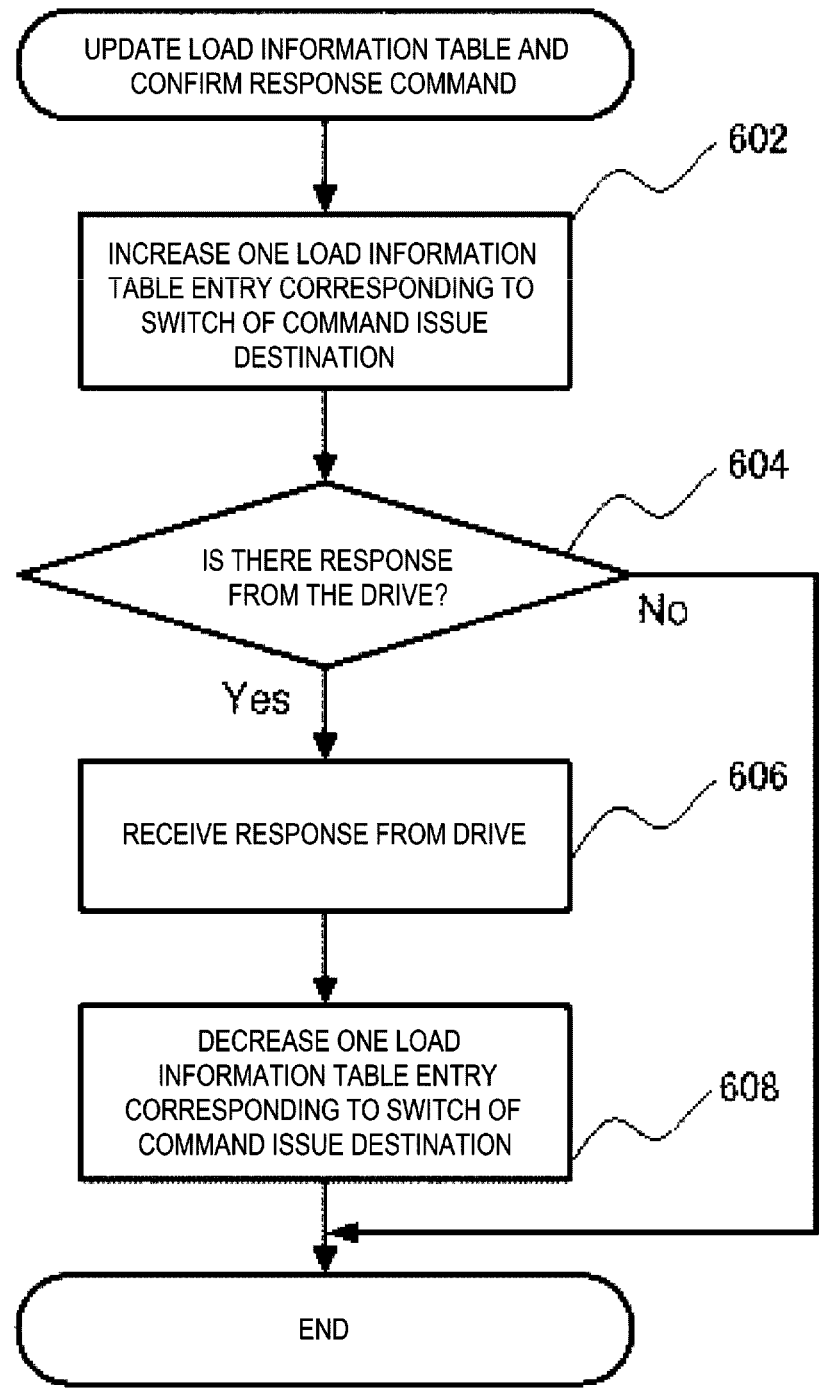

STORAGE SYSTEM AND STORAGE CONTROL METHOD

TECHNICAL FIELD

The present invention relates to a storage system that cascade-connects a backend switch and uses a connection-less storage protocol.

BACKGROUND ART

A connection-less protocol such as a non-volatile memory express (NVMe) for flash storage is becoming widespread as a protocol used by a storage device of a storage system. Further, a method of adding a storage device by cascade-connecting a backend switch is mentioned as a means used for easily expanding the capacity of a storage system.

PTL 1 is known as, for example, a technique that evenly uses the performance of each storage device when a backend switch is cascade-connected. PTL 1 is a technology that evenly uses the performance of each storage device such as a serial attached SCSI (SAS) which is a connection storage protocol.

PRIOR ART LITERATURE

Patent Literature

PTL 1: JP-A-2007-256993

SUMMARY OF INVENTION

Technical Problem

There is a problem that PTL 1 cannot be applied to a storage system using a connection-less protocol such as the NVMe since PTL 1 uses a connection type protocol.

Therefore, when a backend switch is cascade-connected with a connection-less transmission storage protocol, it is not possible to establish a transmission path previously like the connection type protocol. Therefore, there is a problem that a bandwidth of the storage device connected to a latter stage backend switch cannot be obtained sufficiently and a performance difference between the storage devices occurs in former stage and latter stage backend switches.

Therefore, an object of the invention is to eliminate a performance difference of a storage device between backend switches even when the backend switch to which the storage device is connected is cascade-connected in a storage system which uses a connection-less protocol.

Solution to Problem

The invention provides a storage system that includes a plurality of storage devices, a controller that controls the storage device and includes a processor and a memory, and a data transfer path that connects the storage device and the controller. The storage device is divided into a plurality of groups. The controller specifies the storage device belonging to each of the plurality of groups among the plurality of storage devices connected via the plurality of independent data transfer paths, receives an access request to specify the storage device to be accessed, and designates the data transfer path different for each group of the specified storage device to the storage device. The storage device performs data transfer with a connection-less protocol according to the designated data transfer path.

Advantageous Effect

According to the invention, each storage device selects the data transfer path according to a data destination address of the memory of the controller to separate the data transfer paths between the plurality of groups, thereby eliminating the performance difference between the storage devices.

BRIEF DESCRIPTION OF DRAWINGS

FIG. 1A is a block diagram showing an example of a configuration of a storage system according to a first embodiment of the invention.

FIG. 1B is a block diagram showing an example of a switch connection relationship according to the first embodiment of the invention.

FIG. 1C is a diagram showing an example of a drive location table according to the first embodiment of the invention.

FIG. 2 is a flowchart showing an example of a process performed in the storage system according to the first embodiment of the invention.

FIG. 3 is a flowchart showing an example of a process of determining a transfer path according to the first embodiment of the invention.

FIG. 4 is a diagram showing an example of a packet according to the first embodiment of the invention.

FIG. 5A is a block diagram showing an example of a configuration of a storage system according to a second embodiment of the invention.

FIG. 5B is a diagram showing an example of a path-number of switches table according to the second embodiment of the invention.

FIG. 6A is a flowchart showing an example of a process performed in the storage system according to the second embodiment of the invention.

FIG. 6B is a flowchart showing an example of a process of updating the path-number of switches table according to the second embodiment of the invention.

FIG. 7 is a flowchart showing an example of a process of determining a transfer path according to the second embodiment of the invention.

FIG. 8 is a flowchart showing an example of a process of determining a transfer path according to a third embodiment of the invention.

FIG. 9 is a flowchart showing an example of a process of determining a destination performed in step 330 in FIG. 8 according to the third embodiment of the invention.

FIG. 10 is a flowchart showing an example of a process of determining a destination performed in step 340 in FIG. 8 according to the third embodiment of the invention.

FIG. 11A is a block diagram showing an example of a configuration of a storage system according to a fourth embodiment of the invention.

FIG. 11B is a diagram showing an example of a path status table according to the fourth embodiment of the invention.

FIG. 12A is a flowchart showing an example of a process performed in the storage system according to the fourth embodiment of the invention.

FIG. 12B is a flowchart showing an example of a process of updating the path status table according to the fourth embodiment of the invention.

FIG. 13 is a flowchart showing an example of a process of determining a transfer path according to the fourth embodiment of the invention.

FIG. 14A is a block diagram showing an example of a configuration of a storage system according to a fifth embodiment of the invention.

FIG. 14B is a diagram showing an example of a path selection table according to the fifth embodiment of the invention.

FIG. 15 is a flowchart showing an example of a process performed in the storage system according to the fifth embodiment of the invention.

FIG. 16 is a flowchart showing an example of a process of determining a transfer path according to the fifth embodiment of the invention.

FIG. 17A is a block diagram showing an example of a configuration of a storage system according to a sixth embodiment of the invention.

FIG. 17B is a diagram showing an example of a load information table according to the sixth embodiment of the invention.

FIG. 18 is a flowchart showing an example of a process performed in the storage system according to the sixth embodiment of the invention.

FIG. 19 is a flowchart showing an example of a process of updating the load information table according to the sixth embodiment of the invention.

DESCRIPTION OF EMBODIMENTS

Hereinafter, one embodiment of the invention will be described with reference to the accompanying drawings.

First Embodiment

FIG. 1A is a block diagram showing an example of a configuration of a storage system 100 according to an embodiment of the invention. Hereinafter, the same parent sign is given to the same kind of element, and in the case of describing the same kind of element individually, a child sign (for example, a to n) is given to the parent sign to explain.

One or a plurality of (for example, two) host machines 101 are connected to the storage system 100 via a network (not shown).

The storage system 100 includes one or a plurality of drives 132 (for example, a solid state drive (SSD)) storing data as a non-volatile storage device, one or a plurality of switches (backend switches) 130 which connect the drives 132, a storage controller 106 that controls the storage system 100, and a main memory 109 used by the storage controller 106.

Further, as shown in FIG. 1A, when the storage system 100 includes a plurality of switches, the plurality of switches 130 are connected in order from the storage controller 106 (cascade connection).

The host machine 101 includes hardware resources, for example, a CPU, a memory, and an I/O port used for transmission with the storage system 100, which are not shown. The host machine 101 can access data of the storage system 100.

The drive 132 is a storage device that adopts a data transmission protocol of connection-less transmission (for example, a Peripheral Component Interconnect Express (PCIe)).

When the drive 132 performs data transfer to a data transfer area 116 in the main memory 109 of the storage controller 106, the data are transmitted via any one of a path 128a, a path 128b, a path 128c, and a path 128d of each switch 130.

The storage controller 106 includes hardware resources such as a CPU 125 and a main memory 109. The main memory 109 of the storage controller 106 stores a drive location table 110, a request command queue 112, a response command queue 122, a storage control program 114, and a data transmission area 116.

The data transmission area 116 stores data read from the drive 132 and data to be written to the drive 132. The data transmission area 116 corresponds all of virtual areas 126a to 126d corresponding to the four paths 128a to 128d respectively. The number of the virtual areas 126 is not limited to four, and can be set according to the number of paths 128.

The virtual area 126 is a destination address designated by the drive 132 at the time of data transfer and is associated with the path 128 that transfers data. Further, when the drive 132 specifies the virtual area 126 as the data destination, the actual data destination is the data transmission area 116.

In the illustrated example, when a drive 132a specifies the virtual area (0x00) 126a as the destination address at the time of data transfer, the transferred data is stored in the data transmission area 116 via the path 128a. Similarly in the other paths 128b to 128d, the drive 132 selects each data transfer path by transferring the data to the address of the virtual data transmission area associated with each path.

The request command queue 112 is an area that stores a request command (for example, a command that issues an instruction for data transfer to the drive 132) for the drive 132 generated by the storage controller 106. The response command queue 122 is an area that stores a response command (for example, a response command that indicates completion of the data transfer) for the storage controller 106 from the drive 132.

The drive location table 110 is information that specifies switches 130a to 130d to which each of drives 132a to 132h is connected. As shown in FIG. 1C, the drive location table 110 includes, in one entry, a drive No 1101 that stores an identifier specifying the drive 132 and a switch No 1102 that stores an identifier specifying the switch 130 to which the drive 132 is connected.

The storage control program 114 is a program that controls data reading/writing process for the drive 132 after receiving an instruction from the host machine 101. Further, the control program 114 performs initialization of information (for example, the drive location table 110) necessary for the invention.

That is, the storage control program 114 specifies the connected switch 130 for each of drive 132 devices connected via the data transfer path 128, and stores the identifier of the drive 132 and the identifier of the switch 130 in the drive location table 110.

FIG. 1B is a block diagram showing an example of a connection relationship between the switch 130 and the drive 132 of the storage system 100. The switch 130a is connected to the CPU 125 of the storage controller 106. The drives 132a and 132b are connected to the switch 130a.

The switch 130b is connected to the switch 130a. The drives 132c and 132d are connected to the switch 130b. The switch 130c is connected to the switch 130b. The drives 132e and 132f are connected to the switch 130c. The switch 130d is connected to the switch 130c. The drives 132g and 132h are connected to the switch 130d.

In FIG. 1B, the switches 130a to 130d are cascade-connected in order from the CPU 125 of the storage controller 106.

The bandwidths of the paths 128a to 128d are set equally, for example, set to 8 lanes (×8).

The switch 130a includes ports 131a to 131d connected to the preceding device (the CPU 125), ports 131e to 131h connected to the succeeding device (the switch 130b), and ports 131i and 131j connected to the drives 132a and 132b.

Input ports of demultiplexers 133b and 133a are connected to the ports 131i and 131j, respectively. The ports 131a to 131d are connected to output ports of the demultiplexers 133a and 133b. The demultiplexer 133a connects the port 131j and any one of the ports 131a to 131d according to the data destination address. The same applies to the demultiplexer 133b.

The other switches 130b to 130d are constituted similarly to the switch 130a to switch a connection between the preceding device and the succeeding device or the drive 132. In the illustrated example, although two drives 132 are connected to one switch 130, the invention is not limited thereto.

In the first embodiment, the data transfer paths 128a to 128d are assigned to the virtual areas 126a to 126d in advance.

The path 128a passes through the port 131a from port 131h of the switches 130a to 130d and is associated with the data transmission area 116 via the CPU 125 of the storage controller 106.

The path 128b passes through the port 131b from port 131g of the switches 130a to 130d and is associated with the data transmission area 116 via the CPU 125 of the storage controller 106.

The path 128c passes through the port 131c from port 131f of the switches 130a to 130d and is associated with the data transmission area 116 via the CPU 125 of the storage controller 106.

The path 128d passes through the port 131d from port 131e of the switches 130a to 130d and is associated with the data transmission area 116 via the CPU 125 of the storage controller 106.

As described above, the bandwidth of each of paths 128a to 128d is equally assigned. Although FIG. 1A and FIG. 1B show an example in which four switches 130 are cascade-connected, the number of lanes to be assigned to the paths 128a to 128d and a combination of the ports to be used may be changed according to the number of the switches 130. For example, in the case of consisting of two switches 130a and 130b, the paths 128a and 128b may be assigned to the switch 130a and the paths 128c and 128d may be assigned to the switch 130b.

FIG. 2 and FIG. 3 are flowcharts showing an example of a process performed by the storage control program 114 of the storage controller 106. The example of the process of the first embodiment will be described with reference to FIG. 2 and FIG. 3. Each flowchart described below shows an outline of the process within the range necessary for implementation of the invention and may differ from an actual computer program. Further, it is possible to replace steps or to add, change, or delete steps.

In step 200 of FIG. 2, when the storage controller 106 is activated, the storage control program 114 performs initialization to generate the drive location table 110. The storage control program 114 detects that each drive 132 is connected to which of switches 130a to 130d and stores the identifier of each switch 130 corresponding to each drive 132 in the drive location table 110.

In step 205, the storage control program 114 receives an access request from the host machine 101. The storage control program 114 analyzes the access request and specifies the drive 132 of an access target.

Next, the storage control program 114 proceeds to a process of determining transfer path in step 210. FIG. 3 shows an example of a process of determining transfer path performed in step 210. In step 212, the storage control program 114 specifies the location of the drive 132 that performs data transfer by referring to the drive location table 110. In the first embodiment, the location is represented by the number of the switches 130 between the controller 106 and the drive 132. The number one indicates the drive 132 is connected to the switch 130a, the number two indicates the drive 132 is connected to the switch 130b, the number three indicates the drive 132 is connected to the switch 130c, and the number four indicates the drive 132 is connected to the switch 130d.

Thereafter, the storage control program 114 proceeds to any one of steps 214 to 220 according to the specified location. That is, the storage control program 114 determines the path 128 that transfers data according to the number of the switches 130 between the drive 132 and the controller 106.

At this time, the storage control program 114 selects the path 128 so as not to select the same paths 128a to 128d if the switches 130a to 130d to which the drives 132 are connected are different. That is, the first embodiment shows an example in which the paths 128a to 128d corresponding to the addresses of the virtual areas 126a to 126d to be the destinations are assigned to each of the switches 130a to 130d in advance.

For example, when a data transfer target is the drive 132a, the storage control program 114 specifies that the drive 132a is connected to the switch 130a by referring to the drive location table 110 in step 212 of FIG. 3. Thereafter, the storage control program 114 proceeds to step 220 to designate 0x00 as the data destination address such that the drive 132a selects the path 128a as the data transfer path.

The same applies to the drives 132c to 132h which are connected to the other switches 130b to 130d, and the storage control program 114 proceeds to any one of steps 218, 216 and 214 to designate the destination address of the drive 132 as anyone of 0x04, 0x08 and 0x0C by referring to the drive location table 110. The data transfer path for the drives 132c to 132h is selected from paths 128a to 128d according to the designated destination address.

Thereafter, the storage control program 114 proceeds to step 260 in FIG. 2 to generate a request command for the drive 132, and issue the request command to the drive 132 after storing the request command in the request command queue 112.

In step 280, the storage control program 114 refers to the response command queue 122, proceeds to step 282 if there is a response from the drive 132, and returns to step 280 if there is no response.

In step 282, the storage control program 114 completes the process of the request command issued in step 260 by reading the response command from the drive 132 stored in the response command queue 122.

The process of steps 205 to 282 can be repeatedly executed each time the storage controller 106 receives the access request from the host machine 101.

FIG. 4 is a diagram showing an example of a packet of PCIe transferred by the path 128. The illustrated example shows a transaction layer packet 160 of PCIe. The transaction layer packet 160 of PCIe includes a header 161, data 162, and an end to end Cyclic Redundancy Check (ECRC) 163.

The destination address designated by the storage controller 106 in steps 214 to 220 of FIG. 3 indicating the virtual area 126 is set in a destination address 164 in the header 161 in FIG. 4.

The data transferred by the drive 132 that processes and responds the request from the storage controller 106 are divided into packets as in FIG. 4, and are given to the header 161 of each packet by the destination address 164.

When the transfer is performed by the packet as shown in FIG. 4, the transfer path can be selected according to the destination address 164. Unless the paths are separated between the predecessor and the successor backend switches, the path used by the storage device connected to the successor switch can also be used by the storage device connected to the predecessor switch. The transfer of the storage device connected to the successor switch may be hindered by the transfer of the storage device connected to the predecessor switch and the transfer from the storage device connected to the successor switch may be delayed. This is an example in which the performance difference between the storage devices occurs in the predecessor and the successor backend switches described as the problem.

In contrast, in the first embodiment, the storage controller 106 equally assigns the plurality of virtual areas 126a to 126d to the drive 132 of an access target according to the number of the switches 130 between the controller 106 and the drive 132 to separate the data transfer path 128 for each switch 130.

According to the first embodiment, each drive 132 selects the paths 128a to 128d that performs the data transfer according to the data destination address (the virtual area 126) of the main memory 109 designated by the storage controller 106. The paths 128a to 128d connected with the switch 130 are assigned to the plurality of virtual areas 126a to 126d with the same bandwidth. Accordingly, the performance difference between the drives 132a to 132h connected to each of switches 130a to 130d can be eliminated by separating the data transfer path 128 between the plurality of switches 130 and assigning the same bandwidth.

For example, in case that only one switch 130a is connected to the storage controller 106, the all four paths 128a to 128d are assigned to the drive 132 of the switch 130a.

Further, when the switch 130b is connected to the switch 130a to expand the capacity of the storage system 100, the storage controller 106 assigns the paths 128a and 128b to the drives 132 connected to the switch 130a, and assigns the paths 128a, 128b to the drives 132 connected to the switch 130b. Accordingly, in the storage system 100 using the connection-less protocol, the added switch 130b can also establish the same bandwidth as the existing switch 130a.

Although an example in which the switch 130 is used as a device that connects the plurality of drives 132 together to the storage controller 106 is shown in the first embodiment, the invention is not limited thereto. For example, the switch 130 may be a relay device as long as the relay device is cascade-connected in group units and includes one or more drives 132.

For example, it is possible to use the relay device in which the drives 132a, 132b are connected to the storage controller 106 as a first group and the drives 132c, 132d are connected to the first group as a second group. Accordingly, in the storage system 100 adopting a connection-less protocol, a plurality of groups are cascade-connected and the independent data transfer paths 128 are assigned to each group in the same bandwidth so that the performance difference of the drives 132 between groups can be eliminated by making the drive 132 of each group select the different path 128.

Second Embodiment

A second embodiment of the invention will be described with reference to FIG. 5A to FIG. 7. The second embodiment corresponds to a modification of the first embodiment.

FIG. 5A is a block diagram showing an example of a configuration of the storage system 100 of the second embodiment. In FIG. 5A of the second embodiment, a path-switch table 118 is added to the main memory 109 in FIG. 1 shown in the first embodiment, and the other configuration is the same as that of the first embodiment. The second embodiment shows an example in which the maximum number of switches 130 is set to 4.

FIG. 5B is a diagram showing an example of the path-switch table 118. The path-switch table 118 stores the number of valid paths 1181 cascade-connected from the storage controller 106 and the number of valid switches 1182 cascade-connected from the storage controller 106.

FIG. 6A is a flowchart showing an example of a process performed in the storage system 100 according to the second embodiment. In step 390 in FIG. 6A, when the storage controller 106 is activated, the storage control program 114 performs initialization to generate the drive location table 110.

The storage control program 114 detects a location to which of switches 130a to 130d each drive 132 is connected and stores an identifier of each switch 130 corresponding to each drive 132 in the drive location table 110. In addition, in step 390, the storage control program 114 stores the number of the valid paths 128 and the number of the valid switches 130 in the path-number of switches table 118.

In step 395, the storage control program 114 receives an access request from the host machine 101. The storage control program 114 analyzes the access request and specifies the drive 132 to be accessed.

Next, the storage control program 114 proceeds to a process of determining a transfer path in step 300. FIG. 7 is a flowchart showing an example of a process of determining the transfer path performed in step 300. In step 301, the storage control program 114 calculates a quotient of the number of the valid paths 1181 and the number of the valid switches 1182 from the path-number of switches table 118. The storage control program 114 proceeds to step 302 when the quotient is 1, proceeds to step 304 when the quotient is 2, and proceeds to step 318 when the quotient is 4.

In step 302 where the quotient is 1, the storage control program 114 specifies the location of the drive 132 that performs data transfer by referring to the drive location table 110. Thereafter, the storage control program 114 proceeds to any one of steps 306 to 312 according to the specified location. The storage control program 114 determines the paths 128a to 128d according to the number of the switches 130 between the controller 106 and the drive 132.

At this time, the path 128 is selected so as not to select the same paths 128a to 128d if the switches 130a to 130d to which the drives 132 are connected are different. In the second embodiment which is similar to the first embodiment, the paths 128a to 128d corresponding to the addresses of the virtual areas 126a to 126d to be the destinations are assigned in advance to each of the switches 130a to 130d.

For example, when a data transfer target is the drive 132a, the storage control program 114 determines that the drive 132*a* is connected to the switch 130*a* by referring to the drive location table 110 in step 302 in FIG. 7.

Thereafter, the storage control program 114 proceeds to step 312 to designate 0x00 as the data destination address such that the drive 132*a* selects the path 128*a* as the data transfer path.

The same applies to the drives 132*c* to 132*h* which are connected to the other switches 130*b* to 130*d*. The storage control program 114 proceeds to any one of steps 306, 308 and 310 to designate the destination address of the drive 132 as anyone of 0x04, 0x08 and 0x0C by referring to the drive location table 110. The data transfer path for the drives 132*c* to 132*h* is selected from paths 128*a* to 128*d* by the drives 132*c* to 132*h* according to the designated destination address. Thereafter, the storage control program 114 proceeds to step 360 in FIG. 6A.

In step 304 where the quotient is 2, the storage control program 114 specifies the location of the drive 132 that performs data transfer by referring to the drive location table 110. Thereafter, the storage control program 114 proceeds to any one of steps 314 and 316 according to the specified location to determine the path 128 according to the number of the switches 130 between the controller 106 and the drive 132.

At this time, the path 128 is selected so as not to use the same paths 128*a* to 128*d* if the switch 130 to which the drive 132 is connected is different. For example, when specifying that the drive 132 is connected to the switch 130*a* in step 304, the storage control program 114 proceeds to step 316.

In step 316, the storage control program 114 designates 0x00 or 0x04 as the destination address of the drive 132 such that the drive 132 selects the path 128*a* or 128*b* as the data transfer path. Thereafter, the storage control program 114 proceeds to step 360 in FIG. 6A.

When specifying that the drive 132 is connected to the switch 130*b* in step 304, the storage control program 114 proceeds to step 314.

In step 314, the storage control program 114 designates 0x08 or 0x0C as the destination address of the drive 132 such that the drive 132 selects the path 128*c* or 128*d* as the data transfer path. Thereafter, the storage control program 114 proceeds to step 360 in FIG. 6A.

In step 318 where the quotient is 4, 0x0C or 0x08 or 0x04 or 0x00 is designated as the destination address of the drive 132 such that the drive 132 selects any one of the path 128*d*, path 128*c*, path 128*b*, and path 128*a* as the data transfer path. Thereafter, the storage control program 114 proceeds to step 360 in FIG. 6A.

Step 360 is the same process as step 260 in FIG. 2 and the storage control program 114 issues the request command to the drive 132.

Next, the storage control program 114 proceeds to step 370. FIG. 6B is a flowchart showing an example of a process of updating a path-number of switches table performed in step 370.

In step 372 in FIG. 6B, the storage control program 114 determines whether there is a change in the number of paths 128 or the number of switches 130, proceeds to step 374 if there is a change, and proceeds to step 395 again if there is no change.

In step 374, the storage control program 114 updates the number of the changed paths 128 or an entry of the path-number of switches table 118 corresponding to the changed switch 130.

Next, the storage control program 114 returns to step 395 again and repeats the above process. It is assumed that the process of step 370 includes the processes of steps 280, 282 shown in the first embodiment.

According to the second embodiment, the storage control program 114 selects the paths 128*a* to 128*d* that performs data transfer according to the number of the switches 130 between the storage controller 106 and the drive 132. Accordingly, the performance difference between the drives 132*a* to 132*h* connected to each of switches 130*a* to 130*d* can be eliminated by separating the data transfer path 128 between the plurality of switches 130.

Third Embodiment

A third embodiment of the invention will be described with reference to FIG. 8 to FIG. 10. The third embodiment corresponds to a modification of the second embodiment. FIG. 8 is a flowchart showing an example of a process of determining the transfer path performed in step 300 shown in FIG. 6A of the second embodiment.

In the third embodiment, processes other than step 300 in FIG. 6A are the same as those in the second embodiment. Since a content of step 300 in the third embodiment is different from that of the second embodiment, FIG. 8 to FIG. 10 show an example of a process performed in step 300 in the third embodiment.

In step 320 of FIG. 8, the storage control program 114 calculates a quotient of the number of the valid paths 1181 and the number of the valid switches 1182 from the path-number of switches table 118. The storage control program 114 proceeds to step 330 when the quotient is 1, proceeds to step 340 when the quotient is 2, and proceeds to step 350 when the quotient is 4.

FIG. 9 is a flowchart showing an example of a process performed in step 330. In step 332, the storage control program 114 refers to the drive location table 110 and calculates the ratio of the number of drives 132 connected to each of the switches 130. Then, the storage control program 114 performs branching according to the calculated ratio.

When the ratio of the number of the drives 132 connected to each of the switches 130 is 4:0:0:0, the storage control program 114 proceeds to step 334 to equally designate a destination address of the drive 132 connected to the switch 130*a* as any one of 0x0 to 0xC. Accordingly, the drive 132 connected to the switch 130*a* executes data transfer by any one of the paths 128*a* to 128*d*.

When the ratio of the number of the drives 132 connected to each of the switches 130 is 3:1:0:0, the storage control program 114 proceeds to step 336 to equally designate the destination address of the drive 132 connected to the switch 130*a* as any one of 0x00 to 0x08, and designate the destination address of the drive 132 connected to the switch 130*b* as 0x0C. Accordingly, the drive 132 connected to the switch 130*a* executes the data transfer by any one of the paths 128*a* to 128*c* and the drive 132 connected to the switch 130*b* executes the data transfer by the path 128*d*.

The storage control program 114 proceeds to step 338 when the ratio of the number of the drives 132 connected to each of the switches 130 is 2:1:1:0. First, the storage control program 114 equally designates the destination address of the drive 132 connected to the switch 130*a* as any one of 0x00 and 0x04, designates the destination address of the drive 132 connected to the switch 130*b* as 0x08, and designates the destination address of the drive 132 connected to the switch 130*c* as 0x0C.

Accordingly, the drive 132 of the switch 130*a* executes the data transfer by any one of the path 128*a* and the path 128*b*, the drive 132 connected the switch 130*b* executes the data transfer by the path 128c, and the drive 132 connected to the switch 130c executes the data transfer by the path 128d.

When the ratio of the number of the drives 132 connected to each of the switches 130 is 1:1:1:0, the storage control program proceeds to step 339. First, the storage control program 114 designates the destination address of the drive 132 connected to the switch 130a as 0x00, designates the destination address of the drive 132 connected to the switch 130b as 0x04, designates the destination address of the drive 132 connected to the switch 130c as 0x08, and designates the destination address of the drive 132 connected to the switch 130d as 0x0C.

Accordingly, the drive 132 connected to the switch 130a executes the data transfer by the path 128a, the drive 132 connected to the switch 130b executes the data transfer by the path 128b, the drive 132 connected to the switch 130c executes the data transfer by the path 128c, and the drive 132 connected to the switch 130d executes the data transfer by the path 128d.

After the above process, a series of processes in step 330 are ended, thereafter a series of processes in step 300 are ended.

FIG. 10 is a flowchart showing an example of a process performed in step 340. In step 340, the quotient is 2, and there are two of the switches 130 in the third embodiment.

In step 342, the storage control program 114 refers to the drive location table 110 and calculates the ratio of the number of drives 132 connected to each of the switches 130a and 130b.

When the ratio of the number of the drives 132 connected to each of the switches 130 is 4:0, the storage control program 114 proceeds to step 344 to designate the destination address of the drive 132 connected to the switch 130a as any one of 0x0 to 0xC.

Meanwhile, when the ratio of the number of the drives 132 connected to each of the switches 130 is 3:1, the storage control program 114 proceeds to step 346 to designate the destination address of the drive 132 connected to the switch 130a as any one of 0x00 to 0x08, and designate the destination address of the drive 132 connected to the switch 130b as 0x0C.

Accordingly, the drive 132 connected to the switch 130a executes the data transfer by any one of the paths 128a to 128c and the drive 132 connected to the switch 130b executes the data transfer by the path 128d.

Further, when the ratio of the number of the drives 132 connected each of the switches 130 is 1:1, the storage control program 114 proceeds to step 348 to designate the destination address of the drive 132 connected to the switch 130a as any one of 0x00 and 0x04, and designate the destination address of the drive 132 connected to the switch 130b as 0x08 and 0x0C.

Accordingly, the drive 132 connected to the switch 130a executes the data transfer by any one of the paths 128a, 128b, and the drive 132 connected to the switch 130b executes the data transfer by the path 128c or the path 128d.

Thereafter, the storage control program 114 ends a series of process in step 340, and thereafter ends a series of process in step 300.

In step 350 in FIG. 8, since the number of the switch 130 is one, the storage control program 114 designates 0x00 to 0x0C as the data destination addresses such that the drive 132 connected to the switch 130a selects the paths 128a to 128d as the data transfer path.

Thereafter, the storage control program 114 ends a series of processes in step 300.

According to the third embodiment, the storage control program 114 selects the paths 128a to 128d that performs data transfer according to the ratio of the number of the switches 130 between the storage controller 106 and the drive 132. Accordingly, the performance difference between the drives 132a to 132h connected to each of switches 130a to 130d can be eliminated by separating the data transfer paths 128 between the plurality of switches 130.

Fourth Embodiment

A fourth embodiment of the invention will be described with reference to FIG. 11A to FIG. 13. The fourth embodiment corresponds to a modification of the second embodiment. FIG. 11A is a block diagram showing an example of a configuration of the storage system 100 in the fourth embodiment.

In FIG. 11A of the fourth embodiment, a path failure detection circuit 127 is added to the storage controllers 106 in FIG. 5A shown in the second embodiment and a path status table 117 that records whether each of the paths 128 is normal or unusable is added to the main storage 109.

Further, the path failure detection circuit 127 notifies the CPU 125 which of the paths 128 are normal via a path status signal line 119. Further, the path failure detection circuit 127 detects if each of the paths 128 becomes unusable due to an failure or the like and notifies the CPU 125 of that via the path status signal line 119. The other configurations are the same as those in the second embodiment.

FIG. 11B is a diagram showing an example of the path status table 117. The path status table 117 includes, in one entry, the path number 1171 that stores an identifier of each of the paths 128 and a status 1172 that stores the status of each of the paths 128.

FIG. 12A is a flowchart showing an example of a process performed in the storage system 100 according to the fourth embodiment. In step 490 in FIG. 12A, when the storage controller 106 is activated, the storage control program 114 performs initialization to generate the drive location table 110 and the path status table 117.

In step 490, the storage control program 114 detects that each drive 132 is connected to which of switches 130a to 130d and records the identifier of each switch 130 corresponding to each drive 132 in the drive location table 110.

In addition, in step 490, the storage control program 114 records the number of the valid paths 128 and the number of the valid switches 130 in the path-number of switches table 118. Further, the path failure detection circuit 127 detects whether each of the paths 128a to 128d is normal or unusable, and stores each detection result in the path status table 117.

In step 495, the storage control program 114 receives an access request from the host machine 101. The storage control program 114 analyzes the access request and specifies the drive 132 to be accessed.

Next, the storage control program 114 proceeds to a process of determining a transfer path in step 400. FIG. 13 is a flowchart showing an example of a process of determining the transfer path performed in step 400.

In step 401, the storage control program 114 calculates a quotient of the number of normal paths 128 and the number of valid switches 130 from the path status table 117 and the path-number of switches table 118. The storage control program 114 proceeds to step 402 when the quotient is 1, proceeds to step 404 when the quotient is 2, and proceeds to step 418 when the quotient is 4.

In step 402, the storage control program 114 specifies the location (the number of switches 130 between the storage controller 106 and the drive 132) of the drive 132 that performs data transfer by referring to the drive location table 110. Thereafter, the storage control program 114 determines any one of the paths 128a to 128d according to the number of the switches 130 between the storage controller 106 and the drives 132.

That is, if the drive 132 is connected to the switch 130d (the fourth switch), the storage control program 114 proceeds to step 405. If the drive 132 is connected to the switch 130c (the third switch), the storage control program 114 proceeds to step 407. If the drive 132 is connected to the switch 130b (the second switch), the storage control program 114 proceeds to step 409. If the drive 132 is connected to the switch 130a (the first stage), the storage control program 114 proceeds to step 411.

In steps 405 or 407 or 409 or 411, the storage control program 114 determines whether the path 128 corresponding to the location of the drive 132 is normal or not by referring to the path status table 117.

In the fourth embodiment, the path 128d is selected if the drive 132 is connected to the fourth switch 130d, the path 128c is selected if the drive 132 is connected to the third switch 130c, the path 128b is selected if the drive 132 is connected to the second switch 130b, and the path 128a is selected if the drive 132 is the first switch 130a.

The storage control program 114 proceeds to steps 406, 408, 410, and 412 corresponding to the paths 128 to designate the destination address if the selected path 128 is normal.

On the other hand, the storage control program 114 selects a normal one from the paths 128 and designates the destination address corresponding to the selected one of paths 128.

For example, in step 405, the storage control program 114 proceeds to step 407 to determine the status of the path 128c if the path 128d is unusable. Then the storage control program 114 proceeds to step 408 to perform data transfer of the drive 132 connected to the fourth switch 130d by the path 128c if the status of the path 128c is normal. Thereafter, the storage control program 114 proceeds to step 460 in FIG. 12A.

In step 404 where the quotient is 2, the storage control program 114 specifies the location of the drive 132 that performs data transfer by referring to the drive location table 110.

Thereafter, the storage control program 114 select two paths from the paths 128 according to the number of the switches 130 between the storage controller 106 and the drive 132. The storage control program 114 proceeds to step 413 if the drive 132 is connected to the switch 130b (the second switch), and proceeds to step 415 if the drive 132 is connected to the switch 130a (the first switch).

The storage control program 114 designates the destination address by referring to the path status table 117 in steps 413 or 415 such that the data transfer can be performed by using the other two paths of paths 128 when both the selected two paths of paths 128 are unusable.

For example, in step 413, if both the path 128c and 128d are unusable, the storage control program 114 proceeds to step 415 to determine the status of the path 128b and the path 128a. Further, if the status of the path 128b or the path 128a is normal, the storage control program 114 proceeds to step 416.

Then, the storage control program 114 designates the destination address corresponding to the path 128b or the path 128a of the data transfer of the drive 132 connected to the second switch 130b. Thereafter, the storage control program 114 proceeds to step 460.

In step 418 where the quotient is 4, the storage control program 114 designates 0x0C or 0x08 or 0x04 or 0x00 as the destination address of the drive 132 such that the drive 132 selects the path 128d or the path 128c or the path 128b or the path 128a as the data transfer path. At that time, the destination address is designated by referring to the path status table 117 such that the data transfer can be performed using the normal path. Thereafter, the storage control program 114 proceeds to step 460.

Step 460 is the same process as step 260 in FIG. 2 and the storage control program 114 issues the request command to the drive 132.

Next, the process proceeds to step 450. FIG. 12B is a flowchart showing an example of a process performed in step 450.

In step 452 in FIG. 12B, the storage control program 114 determines whether there is a change in the number of paths 128 or the number of switches 130, proceeds to step 454 if there is a change, and proceeds to step 456 if there is no change.

In step 454, the storage control program 114 updates the number of the changed paths 128 or the number of the changed switches 130 in the corresponding entry of the path-number of switches table 118, and proceeds to step 456.

In step 456, the path failure detection circuit 127 determines whether there is a change in the status of the path 128, the storage control program 114 proceeds to step 458 if there is a change, and proceeds to step 495 in FIG. 12A if there is no change. In step 458, the entry in the path status table 117 corresponding to the changed path 128 is updated, and the storage control program 114 returns to step 495 in FIG. 12A to repeat the above process. It is assumed that the process of step 450 includes the processes of steps 280 and 282 shown in the first embodiment.

According to the fourth embodiment, the storage control program 114 switches to the normal one of paths 128 to perform the data transfer if the path 128 corresponding to the number of the switches 130 between the storage controllers 106 and the drive 132 is unusable. Accordingly, even when a failure occurs in one of the path 128, the performance difference between the drives 132a to 132h connected to the switches 130a to 130d can be eliminated by separating the data transfer paths 128 among the plurality of switches 130.

Fifth Embodiment

A fifth embodiment of the invention will be described with reference to FIG. 14A to FIG. 16. The fifth embodiment corresponds to a modification of the first embodiment. FIG. 14A is a block diagram showing an example of a configuration of the storage system 100 of the fifth embodiment.

In FIG. 14A of the fifth embodiment, a supervisor terminal 104 and a storage system management program 108 are added to the storage system 100 shown in FIG. 1 of the first embodiment, further, a path selection table 150 is added to the main memory 109 of the storage controller 106. The other configurations are the same as those in the first embodiment.

The supervisor terminal 104 is a computer that includes hardware resources, for example, a CPU, an input/output device, a memory, and an interface, which are not shown. The CPU of the supervisor terminal 104 can control the storage system 100 (for example, operation instructions such as acquisition and change of configuration information) by executing the storage system management program 108 loaded in the memory.

The path selection table 150 is a table used for designating a path for the data transfer of the drives 132 connected to the switches 130. The supervisor terminal 104 can register identifiers of the paths 128a to 128d that transfer the data of the drives 132 for each switch 130 in the path selection table 150.

FIG. 14B is a diagram showing an example of the path selection table 150. The path selection table 150 includes, in one entry, a switch number 1501 that stores the identifier of the switches 130 and a path 1502 that stores the identifier of the path 128 assigned to the switches 130.

FIG. 15 is a flowchart showing an example of a process performed in the storage system 100 according to the fifth embodiment. In step 590 of FIG. 15, when the storage controller 106 is activated, the storage control program 114 detects that each drive 132 is connected to which of switches 130a to 130d and records the identifier of each switch 130 corresponding to each drive 132 in the drive location table 110.

In step 580, the storage control program 114 receives the path selection information from the supervisor terminal 104 and updates the path selection table 150. The storage control program 114 registers which one of the paths 128 used for each of the drives 132 by each of switches 130 in the path selection table 150.

For example, in an example of FIG. 14B, a path a (the path 128a) is set to the first switch 130a, a path b (the path 128b) is set to the second switch 130b, and a path c (the path 128c) is set to the third switch 130c, and a path d (the path 128d) is set to the fourth switch 130d.

In step 585, the storage control program 114 receives an access request from the host machine 101. The storage control program 114 analyzes the access request and specifies the drive 132 to be accessed.

Next, the storage control program 114 proceeds to step 500. FIG. 16 is a flowchart showing an example of a process of determining the transfer path performed in step 500.

In step 502 of FIG. 16, the storage control program 114 specifies the switch 130 to which the specified one of the drives 132 is connected, by referring to the drive location table 110, and proceeds to step 504.

In step 504, the storage control program 114 specifies the path 128 used by the drive 132 for data transfer by referring to the entry in the path selection table 150. Thereafter, the storage control program 114 proceeds to any one of steps 506 to 510 according to the specified one of the paths 128a to 128d to designate a destination address corresponding to the path 128 used for data transfer. Thereafter, the storage control program 114 proceeds to step 560 in FIG. 15.

Step 560 is the same process as step 260 in FIG. 2 and the storage control program 114 issues the request command to the drive 132. After issuing the request command, the processes of steps 280 and 282 shown in the first embodiment are executed although not shown. Thereafter, the storage control program 114 returns to the step 580 to repeat the above process.

As described above, according to the fifth embodiment, the path selection table 150 can be updated by the supervisor terminal 104 even while the storage controller 106 performs the data transfers for the drives 130.

Sixth Embodiment

A sixth embodiment of the invention will be described with reference to FIG. 17A to FIG. 19. Each of the following embodiments including the present embodiment corresponds to a modification on the first embodiment.

FIG. 17A is a block diagram showing an example of a configuration of the storage system 100 in the sixth embodiment. In FIG. 17A of the sixth embodiment, a load information table 120 that stores a load information of each switch 130 to which the drive 132 is connected is added to the main memory 109 of the storage controller 106 of the FIG. 1 shown in the first embodiment. In the sixth embodiment, as shown in FIG. 17B, the load information table 120 records the sum total of the number of commands being issued to each drive 132 by the switch 130 to which the drive 132 is connected. The other configurations are the same as those in the first embodiment.

FIG. 17B is a diagram showing an example of the load information table 120. The load information table 120 includes, in one entry, a switch number 1201 that stores a location or an identifier of the switch 130 and the number of commands being issued 1202 that stores the number of commands being issued to the drive 132 connected to the switch 130.

FIG. 18 is a flowchart showing an example of a process performed in the storage system 100 according to the sixth embodiment. In step 690 of FIG. 18, when the storage controller 106 is activated, the storage control program 114 detects that each drive 132 is connected to which of switches 130 and records the identifier of each switch 130 corresponding to each drive 132 in the drive location information table 110. Further, in step 690, the storage control program 114 initializes all entries in the load information table 120 with 0.

In step 695, the storage control program 114 receives an access request from the host machine 101. The storage control program 114 analyzes the access request and specifies the drive 132 to be accessed.

Step 610 is the same process of determining transfer path as step 210 shown in FIG. 2 of the first embodiment, and the destination address corresponding to the determined path 128 is designated.

Step 660 is the same process as step 260 shown in FIG. 2 of the first embodiment and the storage control program 114 issues the request command to the drive 132.

Next, the storage control program 114 proceeds to step 600. FIG. 19 is a flowchart showing an example of a process performed in step 600 in FIG. 18.

In step 602 in FIG. 19, the storage control program 114 increases the number of commands being issued 1202 in the entry of the load information table 120 corresponding to the switch 130 to which the drive 132 accessed in the request command is connected. In the sixth embodiment, the value of the number of commands being issued 1202 indicates the load of the switch 130.

In step 604, the storage control program 114 refers to the response command queue 122, proceeds to step 606 if there is a response from the drive 132 connected to the switch 130, and proceeds to step 622 in FIG. 18 if there is no response.

In step 606, when the drive 132 completes the data transfer to the data transfer area 116, the response command is stored in the response command queue 122, and the storage control program 114 completes the process of the request command issued in step 660 by removing the response command from the response command queue 122.

In step 608, the storage control program 114 decreases the number of commands being issued 1202 of the entry of the load information table 120 corresponding to the drive 132 corresponding to the request command completed in step 606. Thereafter, the storage control program 114 proceeds to step 622 in FIG. 18.

In step 622 in FIG. 18, the storage control program 114 refers to the load information table 120 and calculates the sum total value of the number of commands being issued to the drives 132c to 132h connected to the switches 130b to 130d, and proceeds to step 624 if the sum total value is 0.

In step 624, the storage control program 114 changes the destination addresses of the drives 132a and 132b connected to the first switch 130a as anyone of 0x00 to 0x0C, and returns to step 695 to repeat the above process.

In step 622, if the sum total value of the number of commands being issued to the drives 132c to 132h connected to the switches 130b to 130d is not 0, the storage control program 114 returns to step 695 again to repeat the above process.

According to the sixth embodiment, the storage control program 114 can monitor the load of the switch 130 connected to the storage controller 106 and change the path 128 according to the load.

SUMMARY

The invention is not limited to each of the above-described embodiments, and includes various modifications. For example, the above-described embodiments have been described in detail for easy understanding of the invention, and are not necessarily limited to those including all the configurations described above. Further, a part of a configuration of a certain embodiment can be replaced with a configuration of the other embodiments and the configuration of the other embodiments can be added to the configuration of the certain embodiment. Further, other configurations may be added to, deleted from or replaced with a part of a configuration of each embodiment, which can be applied alone or in combination.

Further, the configurations, functions, processing units, processing means, or the like may be achieved by hardware by means of designing a part or all of them with, for example, an integrated circuit. Further, the configurations, functions, or the like may be achieved by software by means of interpreting and executing a program by a processor used for achieving the respective functions. Information such as a program, a table, and a file used for achieving the functions can be stored in a recording device such as a memory, a hard disk and a solid state drive (SSD), or a recording medium such as an IC card, an SD card, and a DVD.

In addition, a control line and an information line are shown in consideration of necessity for description, and not all control lines and information lines are necessarily shown in the device. In practice, it may be considered that almost all the configurations are connected with each other.

The invention claimed is:

1. A storage system comprising:
a plurality of storage devices;
a controller that controls the storage device and includes a processor and a memory; and
a plurality of data transfer paths connecting at least one of the plurality of storage devices and the controller, wherein the controller is configured to
determine for each of the plurality of storage devices, at least one connection to a plurality of switches
receive an access request to specify one of the plurality of storage devices to be accessed,
determine a value based on a number of the plurality of data transfer paths and a number of the plurality of switches,
designate based on the value, one of the plurality of data transfer paths for each of the at least one connection of the at least one of the plurality of specified storage devices,
determine if the designated data transfer path is usable,
perform, via the at least one of the plurality of specified storage devices, data transfer by a connection-less protocol according to the designated data transfer path
determine if there is a change in the number of the plurality of data transfer paths;
determine whether there is a change in a status of any of the plurality of data transfer paths; and
when there is a change in the status of any of the plurality of data transfer paths, update the status and when a different access request is received use the updated status to designate the one of the plurality of data transfer paths for the different access request.

2. The storage system according to claim 1, wherein the controller designates the one of the plurality of data transfer paths evenly in bandwidth for each of the at least one connection of the at least one of the plurality of specified storage devices.

3. The storage system according to claim 1, wherein prior to determining the at least one connection to the plurality of switches for each of the plurality of storage devices, the controller sets a plurality of destination addresses on the memory corresponding to the plurality of data transfer paths, and designates one of the plurality of destination addresses corresponding to the plurality of data transfer paths for each of the plurality of storage devices.

4. The storage system according to claim 3, wherein each of the plurality of storage devices divide data to be transferred to the controller into packets, and one of the plurality of data destination addresses designated by the controller is given to the packets.

5. The storage system according to claim 1, wherein the plurality of switches includes a first group and a second group, and the second group is cascade-connected to the first group.

6. The storage system according to claim 5, wherein the controller includes drive location information that includes an identifier of each of the plurality of switches to which each of the plurality of storage devices belong, specifies one of the plurality of storage devices to be accessed and the identifier of one of the plurality of switches to which the accessed storage devices belongs based on the drive location information, and designates one of the plurality of the data transfer paths corresponding to the identifier of the specified one of the plurality of storage devices.

7. The storage system according to claim 6, the controller includes path switching information that includes the number of the plurality of data transfer paths between the cascade-connected first group and the controller and the number of the plurality of switches, specifies one of the plurality of storage devices to be accessed and the identifier of the specified one of the plurality of switches based on the drive location information, and selects one of the plurality of data transfer paths based on the path switching information.

8. The storage system according to claim 7,
wherein the controller specifies at least one of the plurality of storage devices to be accessed and the identifiers of the plurality of switches based on the drive location information, and selects the designated data transfer path according to the ratio of the number of the plurality of data transfer paths and the number of the plurality of switches held in the path switching information.

9. The storage system according to claim 6,
wherein the controller includes a failure detector that detects the status of the plurality of data transfer paths.

10. The storage system according to claim 6,
wherein the controller includes path selection information that designates one of the plurality of data transfer paths used by the plurality of storage devices belonging to one of the plurality of switches, specifies at least one of the plurality of storage devices to be accessed and the identifier of one of the plurality of switches based on the drive location information, selects one of the plurality of data transfer paths based on the path selection information, and updates the path selection information according to an instruction from a supervisor terminal connected to the storage system.

11. The storage system according to claim 6,
wherein the controller includes load information that includes a load of the plurality of switches to which the plurality of storage devices belongs, specifies at least one of the plurality of storage devices to be accessed and the identifier of the plurality of switches based on the drive location information, and selects the designated data transfer path based on the load information.

12. The storage system according to claim 6,
wherein the first group includes at least one of the plurality of storage devices that are connected to a first switch that is connected to the controller and communicate with the controller,
the second group includes at least one of the plurality of storage devices that are connected to a second switch that is connected to the first switch and communicate with the controller,
the plurality of switches includes the first group and the second group,
the drive location information holds a relationship between the storage device and the switch, and
the controller receives the access request from a host machine connected to the storage system, specifies at least one of the plurality of storage devices to be accessed, and designates one of the plurality of data transfer paths which is different between the first group and the second group.

13. A storage control method for controlling a plurality of storage devices by a controller including a processor and a memory, the storage control method comprising:
detecting, via the controller, the plurality of storage devices that are connected via a plurality of data transfer paths, determining for each of the plurality of storage devices at least one connection to a plurality of switches, and saving, via the memory, the at least one connection for each of the plurality of storage devices;
receiving an access request and specifying one of the plurality of storage devices to be accessed;
determining a value based on a number of the plurality of data transfer paths and a number of the plurality of switches;
designating based on the value, one of the plurality of data transfer paths for each of the at least one connection of the at least one of the plurality of specified storage devices;
determining if the designated data transfer path is usable;
performing data transfer with a connection-less protocol according to the designated data transfer path;
determining if there is a change in the number of the plurality of data transfer paths;
determining whether there is a change in a status of any of the plurality of data transfer paths; and
when there is a change in the status of any of the plurality of data transfer paths, update the status and when a different access request is received use the updated status to designate the one of the plurality of data transfer paths for the different access request.

14. The storage control method according to claim 13,
wherein the controller designates the one of the plurality of data transfer paths evenly in bandwidth for each of the at least one connection of the at least one of the plurality of specified storage devices.

* * * * *